(12) United States Patent
Fish, Jr. et al.

(10) Patent No.: US 8,836,532 B2
(45) Date of Patent: Sep. 16, 2014

(54) NOTIFICATION APPLIANCE AND METHOD THEREOF

(75) Inventors: Richard T. Fish, Jr., Jenison, MI (US);
Greg R. Pattok, Holland, MI (US);
Scott R. Edwards, Alto, MI (US);
Jeremy A. Fogg, Holland, MI (US);
Darin D. Tuttle, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 965 days.

(21) Appl. No.: 12/640,642

(22) Filed: Dec. 17, 2009

(65) Prior Publication Data

US 2011/0012746 A1 Jan. 20, 2011

Related U.S. Application Data

(60) Provisional application No. 61/226,121, filed on Jul. 16, 2009.

(51) Int. Cl.
*G08B 3/00* (2006.01)
(52) U.S. Cl.
USPC ...... 340/691.1; 340/501; 340/540; 340/691.8
(58) Field of Classification Search
None
See application file for complete search history.

(56) References Cited

U.S. PATENT DOCUMENTS

| | | |
|---|---|---|
| 3,312,826 A | 4/1967 | Finkle |
| 3,665,461 A | 5/1972 | Gnägi et al. |
| 3,765,842 A | 10/1973 | Purt |
| 3,801,972 A | 4/1974 | Ho Kim et al. |
| 3,868,184 A | 2/1975 | Marsocci |
| 3,872,355 A | 3/1975 | Klein et al. |
| 4,004,288 A | 1/1977 | Webb, Jr. |
| 4,080,568 A | 3/1978 | Funk |
| 4,101,880 A | 7/1978 | Haus |
| 4,114,089 A | 9/1978 | Ahmed |
| 4,132,926 A | 1/1979 | Ohta et al. |
| 4,163,226 A | 7/1979 | Ogawa |
| 4,180,803 A | 12/1979 | Wesemeyer et al. |
| 4,247,848 A | 1/1981 | Kitta et al. |
| 4,297,688 A | 10/1981 | Kakigi |

(Continued)

FOREIGN PATENT DOCUMENTS

| | | | | |
|---|---|---|---|---|
| EP | 0564127 A2 | 10/1993 | | |
| JP | 2000-48167 | * | 2/2000 | ................ G06T 1/00 |

OTHER PUBLICATIONS

BRP Report—Countermeasures—Ford Fleet Showroom CVPI Officer Safety, May 7, 2006, pp. 1-11.*

(Continued)

*Primary Examiner* — Nabil Syed
*Assistant Examiner* — Brian Wilson
(74) *Attorney, Agent, or Firm* — Price Heneveld LLP; Scott P. Ryan

(57) ABSTRACT

A notification appliance configured to emit a notification output based upon at least one detected environmental condition is provided that includes a sensor configured to detect the at least one environmental condition, at least one light emitting diode (LED) light source configured to emit light having an intensity during a pulse time period, and a controller in communicative connection with the sensor and the LED light source, wherein the controller is configured to control the LED light source so that the pulse time period is approximately less than or equal to two hundred milliseconds (200 ms), while substantially maintaining an effective intensity and enhancing a perceived brightness of the emitted light.

56 Claims, 29 Drawing Sheets

(56) References Cited

U.S. PATENT DOCUMENTS

| | | | |
|---|---|---|---|
| 4,363,031 A | 12/1982 | Reinowitz | |
| 4,432,041 A | 2/1984 | Pfisterer et al. | |
| 4,511,889 A | 4/1985 | Atwater | |
| 4,654,629 A | 3/1987 | Bezos et al. | |
| 4,733,224 A | 3/1988 | Kimura | |
| 4,734,680 A | 3/1988 | Gehman et al. | |
| 4,742,328 A | 5/1988 | Arai et al. | |
| 4,792,797 A | 12/1988 | Tanguay et al. | |
| 4,839,527 A | 6/1989 | Leitch | |
| 4,870,395 A | 9/1989 | Belano | |
| D308,947 S | 7/1990 | Downing | |
| 4,952,906 A | 8/1990 | Buyak et al. | |
| 4,965,556 A | 10/1990 | Brodecki et al. | |
| 5,019,805 A | 5/1991 | Curl et al. | |
| 5,034,847 A | 7/1991 | Brain | |
| 5,078,039 A | 1/1992 | Tulk et al. | |
| RE33,920 E | 5/1992 | Tanguay et al. | |
| 5,121,033 A | 6/1992 | Kosich | |
| 5,213,513 A | 5/1993 | Brown et al. | |
| 5,233,337 A | 8/1993 | Takahashi | |
| 5,386,209 A | 1/1995 | Thomas | |
| 5,398,041 A | 3/1995 | Hyatt | |
| 5,424,560 A | 6/1995 | Norman et al. | |
| 5,469,341 A | 11/1995 | Green | |
| 5,475,361 A | 12/1995 | Curran et al. | |
| 5,486,811 A | 1/1996 | Wehrle et al. | |
| 5,525,962 A | 6/1996 | Tice | |
| 5,563,578 A | 10/1996 | Isenstein | |
| 5,570,077 A | 10/1996 | Swieboda | |
| 5,577,834 A | 11/1996 | Mazies et al. | |
| 5,587,705 A | 12/1996 | Morris | |
| 5,592,147 A | 1/1997 | Wong | |
| 5,598,139 A | 1/1997 | Karim et al. | |
| 5,622,427 A | 4/1997 | Lemons et al. | |
| 5,627,515 A | 5/1997 | Anderson | |
| 5,691,703 A | 11/1997 | Roby et al. | |
| 5,705,979 A | 1/1998 | Fierro et al. | |
| 5,708,414 A | 1/1998 | Peltier et al. | |
| D390,797 S | 2/1998 | Yao et al. | |
| 5,767,782 A | 6/1998 | Mongeau | |
| 5,777,551 A | 7/1998 | Hess | |
| 5,801,633 A | 9/1998 | Soni | |
| 5,803,579 A | 9/1998 | Turnbull et al. | |
| 5,850,180 A | 12/1998 | Hess | |
| 5,886,638 A | 3/1999 | Tanguay | |
| 5,896,091 A | 4/1999 | Soderlund | |
| 5,898,369 A | 4/1999 | Godwin | |
| 5,912,626 A | 6/1999 | Soderlund | |
| 5,933,078 A | 8/1999 | O'Donnell | |
| 5,966,078 A | 10/1999 | Tanguay | |
| 5,966,079 A | 10/1999 | Tanguay | |
| 5,969,600 A | 10/1999 | Tanguay | |
| 5,973,603 A | 10/1999 | Judy | |
| 5,977,872 A * | 11/1999 | Guertin | 340/515 |
| 5,988,645 A | 11/1999 | Downing | |
| 6,002,347 A | 12/1999 | Daly et al. | |
| 6,016,038 A | 1/2000 | Mueller et al. | |
| 6,027,693 A | 2/2000 | Molina et al. | |
| 6,078,269 A | 6/2000 | Markwell et al. | |
| 6,107,925 A | 8/2000 | Wong | |
| 6,110,038 A | 8/2000 | Stern | |
| 6,121,874 A | 9/2000 | O'Donnell | |
| 6,144,310 A | 11/2000 | Morris | |
| 6,150,774 A | 11/2000 | Mueller et al. | |
| 6,150,943 A * | 11/2000 | Lehman et al. | 340/628 |
| 6,217,196 B1 | 4/2001 | Kosich et al. | |
| 6,225,910 B1 | 5/2001 | Kadwell et al. | |
| 6,229,429 B1 | 5/2001 | Horon | |
| 6,243,001 B1 | 6/2001 | Kodaka | |
| 6,285,140 B1 | 9/2001 | Ruxton | |
| 6,297,610 B1 | 10/2001 | Bauer et al. | |
| 6,311,021 B1 | 10/2001 | Kosich | |
| 6,313,744 B1 | 11/2001 | Capowski et al. | |
| 6,326,897 B2 | 12/2001 | Kadwell et al. | |
| 6,340,868 B1 * | 1/2002 | Lys et al. | 315/185 S |
| 6,341,874 B1 | 1/2002 | Rubin | |
| 6,348,871 B1 | 2/2002 | Tanguay et al. | |
| 6,351,219 B1 | 2/2002 | Tanguay et al. | |
| RE37,578 E * | 3/2002 | Gleckman | 353/122 |
| 6,353,395 B1 | 3/2002 | Duran | |
| 6,362,743 B1 | 3/2002 | Tanguay et al. | |
| 6,377,182 B1 | 4/2002 | Devine et al. | |
| 6,384,723 B1 | 5/2002 | Keeler et al. | |
| 6,411,201 B1 | 6/2002 | Hur et al. | |
| 6,426,697 B1 | 7/2002 | Capowski et al. | |
| 6,476,726 B1 | 11/2002 | Pederson | |
| 6,483,254 B2 | 11/2002 | Vo et al. | |
| 6,498,440 B2 | 12/2002 | Stam et al. | |
| 6,522,248 B1 | 2/2003 | Andres et al. | |
| 6,528,954 B1 | 3/2003 | Lys et al. | |
| 6,556,132 B1 | 4/2003 | Pattok et al. | |
| RE38,183 E | 7/2003 | Kosich et al. | |
| 6,590,343 B2 | 7/2003 | Pederson | |
| 6,600,424 B1 | 7/2003 | Morris | |
| 6,603,243 B2 | 8/2003 | Parkyn et al. | |
| 6,611,204 B2 | 8/2003 | Schmurr | |
| 6,614,347 B2 | 9/2003 | Tanguay | |
| 6,624,597 B2 | 9/2003 | Dowling et al. | |
| 6,646,566 B1 | 11/2003 | Tanguay | |
| 6,653,942 B2 | 11/2003 | Kadwell et al. | |
| 6,680,834 B2 | 1/2004 | Williams | |
| 6,693,529 B2 | 2/2004 | Suzuki et al. | |
| 6,717,376 B2 | 4/2004 | Lys et al. | |
| 6,720,881 B1 | 4/2004 | Halliday | |
| 6,720,883 B2 | 4/2004 | Kuhr et al. | |
| 6,747,420 B2 | 6/2004 | Barth et al. | |
| 6,753,786 B1 | 6/2004 | Apperson et al. | |
| 6,762,688 B2 | 7/2004 | Johnston et al. | |
| 6,777,891 B2 | 8/2004 | Lys et al. | |
| 6,778,082 B2 | 8/2004 | Goodwin | |
| 6,788,011 B2 | 9/2004 | Mueller et al. | |
| 6,788,197 B1 | 9/2004 | Thuillard et al. | |
| 6,791,453 B1 | 9/2004 | Andres et al. | |
| 6,793,375 B2 | 9/2004 | Anderson | |
| 6,801,003 B2 | 10/2004 | Schanberger et al. | |
| 6,806,659 B1 | 10/2004 | Mueller et al. | |
| 6,816,068 B2 | 11/2004 | McCuen et al. | |
| 6,816,069 B2 | 11/2004 | Quigley | |
| 6,819,252 B2 | 11/2004 | Johnston et al. | |
| 6,826,059 B2 | 11/2004 | Bückle et al. | |
| 6,839,636 B1 | 1/2005 | Sunshine et al. | |
| 6,864,795 B2 * | 3/2005 | Smith et al. | 340/573.1 |
| 6,876,305 B2 | 4/2005 | Kadwell et al. | |
| 6,911,917 B2 | 6/2005 | Higgs | |
| 6,950,079 B2 | 9/2005 | Inoue | |
| 6,954,137 B2 | 10/2005 | Stewart et al. | |
| 6,958,689 B2 | 10/2005 | Anderson et al. | |
| 6,967,582 B2 | 11/2005 | Tice et al. | |
| 6,989,757 B2 | 1/2006 | Geoffrey et al. | |
| 6,998,991 B1 | 2/2006 | Goldstein et al. | |
| 7,005,971 B2 | 2/2006 | Stewart et al. | |
| 7,005,994 B2 | 2/2006 | King | |
| 7,006,003 B2 | 2/2006 | Zimmerman et al. | |
| 7,038,399 B2 | 5/2006 | Lys et al. | |
| 7,038,593 B2 | 5/2006 | Pederson | |
| 7,057,517 B1 | 6/2006 | Convery | |
| 7,079,020 B2 | 7/2006 | Stilp | |
| 7,103,511 B2 | 9/2006 | Petite | |
| 7,109,874 B2 | 9/2006 | Pilkington | |
| 7,126,467 B2 | 10/2006 | Albert et al. | |
| 7,126,487 B2 | 10/2006 | Kaiser et al. | |
| 7,129,833 B2 | 10/2006 | Albert | |
| 7,142,105 B2 | 11/2006 | Chen | |
| 7,148,797 B2 | 12/2006 | Albert | |
| 7,153,013 B2 | 12/2006 | Pederson | |
| 7,158,023 B2 | 1/2007 | Kaiser | |
| 7,158,040 B2 | 1/2007 | Morris | |
| 7,161,311 B2 | 1/2007 | Mueller et al. | |
| 7,167,099 B2 | 1/2007 | Kadwell et al. | |
| D536,274 S | 2/2007 | Rosenblatt | |
| 7,173,525 B2 | 2/2007 | Albert | |
| 7,186,003 B2 | 3/2007 | Dowling et al. | |
| 7,186,979 B1 | 3/2007 | Wong | |
| 7,202,613 B2 | 4/2007 | Morgan et al. | |

(56) References Cited

U.S. PATENT DOCUMENTS

| | | | |
|---|---|---|---|
| 7,214,939 B1 | 5/2007 | Wong | |
| 7,227,463 B2 | 6/2007 | Merrell | |
| 7,233,781 B2 | 6/2007 | Hunter et al. | |
| 7,242,288 B2 | 7/2007 | Kaiser et al. | |
| 7,245,216 B2 | 7/2007 | Burkley et al. | |
| 7,248,156 B2 | 7/2007 | Wisniewski et al. | |
| 7,258,463 B2 | 8/2007 | Sloan et al. | |
| 7,261,440 B2 | 8/2007 | Kwasny | |
| 7,262,705 B2 | 8/2007 | Back et al. | |
| 7,294,978 B1 | 11/2007 | Shuy | |
| 7,298,252 B1 | 11/2007 | Sutardja et al. | |
| 7,300,185 B1 | 11/2007 | Ruffin et al. | |
| 7,301,455 B2 | 11/2007 | McKenna et al. | |
| 7,319,298 B2 | 1/2008 | Jungwirth et al. | |
| 7,319,403 B2 | 1/2008 | Woodard et al. | |
| 7,321,783 B2 | 1/2008 | Kim | |
| 7,327,247 B2 | 2/2008 | Tice | |
| 7,332,877 B2 | 2/2008 | Crodian et al. | |
| 7,333,129 B2 | 2/2008 | Miller et al. | |
| 7,335,885 B2 | 2/2008 | Wong | |
| 7,336,168 B2 | 2/2008 | Kates | |
| 7,337,856 B2 | 3/2008 | Lund et al. | |
| 7,339,468 B2 | 3/2008 | Andres et al. | |
| 7,342,488 B2 | 3/2008 | Wolfe et al. | |
| 7,360,397 B2 | 4/2008 | Petrovic et al. | |
| 7,369,955 B2 | 5/2008 | Lee | |
| 7,372,370 B2 | 5/2008 | Stults et al. | |
| 7,374,311 B2 | 5/2008 | Rains, Jr. et al. | |
| 7,378,954 B2 | 5/2008 | Wendt | |
| 7,382,243 B1 | 6/2008 | Shepher | |
| 7,385,517 B2 | 6/2008 | Andres et al. | |
| 7,400,439 B2 | 7/2008 | Holman | |
| 7,417,540 B2 | 8/2008 | Johnston et al. | |
| 7,423,544 B2 | 9/2008 | Cartwright et al. | |
| 7,449,990 B2 | 11/2008 | Andres et al. | |
| 7,479,731 B2 | 1/2009 | Udagawa | |
| 7,501,958 B2 | 3/2009 | Saltzstein et al. | |
| 7,535,443 B2 | 5/2009 | Lindqvist | |
| 7,553,044 B2 | 6/2009 | Wedell | |
| 7,561,036 B2 | 7/2009 | Pederson | |
| 7,586,271 B2 | 9/2009 | Shuy | |
| 7,648,256 B2 * | 1/2010 | Shiratsuchi et al. | 362/268 |
| 7,679,296 B2 | 3/2010 | Kamatani | |
| 8,013,755 B2 | 9/2011 | Rock et al. | |
| 2002/0163438 A1 | 11/2002 | Kuhr et al. | |
| 2003/0206411 A9 | 11/2003 | Dowling et al. | |
| 2004/0021580 A1 | 2/2004 | Higgs | |
| 2004/0052090 A1 | 3/2004 | Pederson | |
| 2004/0056765 A1 | 3/2004 | Anderson et al. | |
| 2004/0085781 A1 | 5/2004 | Wesson | |
| 2004/0233664 A1 | 11/2004 | Beeson et al. | |
| 2005/0110808 A1 | 5/2005 | Goldschmidt et al. | |
| 2005/0134188 A1 | 6/2005 | Lindqvist | |
| 2005/0219060 A1 * | 10/2005 | Curran et al. | 340/815.45 |
| 2006/0039140 A1 | 2/2006 | Magarill | |
| 2006/0092012 A1 | 5/2006 | Kaiser et al. | |
| 2006/0164234 A1 | 7/2006 | Acar | |
| 2007/0171044 A1 | 7/2007 | Ollis et al. | |
| 2007/0182543 A1 | 8/2007 | Luo | |
| 2007/0241875 A1 | 10/2007 | Costa | |
| 2007/0279213 A1 | 12/2007 | Cartwright et al. | |
| 2007/0285262 A1 | 12/2007 | Lax | |
| 2008/0001061 A1 | 1/2008 | Glassner et al. | |
| 2008/0012716 A1 | 1/2008 | Saltzstein et al. | |
| 2008/0030319 A1 | 2/2008 | McKenna et al. | |
| 2008/0055097 A1 | 3/2008 | Chidakel et al. | |
| 2008/0011706 A1 | 5/2008 | Lang | |
| 2008/0116827 A1 | 5/2008 | Williams | |
| 2008/0173817 A1 | 7/2008 | Goldstein et al. | |
| 2008/0211678 A1 | 9/2008 | Andres et al. | |
| 2008/0229831 A1 | 9/2008 | Serban et al. | |
| 2009/0040065 A1 * | 2/2009 | Dalton et al. | 340/815.45 |
| 2009/0059602 A1 * | 3/2009 | Santos et al. | 362/351 |
| 2009/0072989 A1 | 3/2009 | Rock et al. | |
| 2009/0091466 A1 | 4/2009 | Sendrowski, Jr. | |

OTHER PUBLICATIONS

Jensen, "Inductive Based Switching Regulator Circuits Provide High Efficiency White LED Drives," National Semiconductor Note 1250, Sep. 2002, 3 pages, found at: www.national.com.

Lecture 23—Temporal Vision Phenomena, Vision Science II—Monocular Sensory Aspects of Vision, pp. 1-3 (Oct. 14, 2004).

Huib De Ridder, Dynamic properties of human brightness perception, Eindhoven Technical University, pp. 1-127 (Oct. 13, 1987).

Richard W. Bowen & Joel Pokorny, Target Edge Sharpness and Temporal Brightness Enhancement, Research Note, Department of Psychology, Loyola University of Chicago, vol. 18. pp. 1691-1695 (Sep. 30, 1977).

Alpem et al., The Dependence of the Photopupil Response on Flash Duration and Intensity, Journal of General Physiology, vol. 47, pp. 265-278, The Rockefeller University Press 1963.Downloaded from www.jgp.rupress.org.

Marston, R.M., Optoelectronic Circuits Manual, NEWNES, p. 35 and 36, (2nd ed. 2009). Found at: http://www.google.com/books?id=W6m7NC0nvE8C&printsec=frontcover&dq=optoelectronics+circuits+manual&cd=1#v=onepage&q=&f=false.

Bowman et al., Waking effectiveness of visual alerting signals, Journal of Rehabilitation Research and Development, vol. 32, No. 1, pp. 43-54 (Feb. 2005).

Cote, Arthur E., Operation of Fire Protection Systems, National Fire Protection Association, Jones and Bartlett Publishers (2003). Found at: http://books.google.com/books?id=kZEzogMXGwC&pg=PA8&lpg=PA8&dq=chapter+3+notificationappliances&source=bl&ots=LbdWjEyVvl&sig=AofHvogINREXN_RNMok183A_QsM&hl=en&ei=3PdeS6fSJZK-NraWgd8L&sa=X&oi=book_result&ct=result&resnum=4&ved=0CBMQ6AEwAw%23#v=onepage&q=chapter%203%20notification%20appliances&f=false.

BRP Report—Countermeasures—Ford Fleet Showroom CVPI Officer Safety, pp. 1-11. Found at: https://www.fleet.ford.com/showroom/CVPI/pdfs/BRP_Report_Out_Countermeasures.pdf.

Power Light Source Technical Datasheet DS23, LUEXON STAR, Document #: DS23 (Feb. 2004).

* cited by examiner

| DEGREES | PERCENT OF RATING |
|---|---|
| 0 | 100 |
| 5 - 25 | 90 |
| 30 - 45 | 75 |
| 50 | 55 |
| 55 | 45 |
| 60 | 40 |
| 65 | 35 |
| 70 | 35 |
| 75 | 30 |
| 80 | 30 |
| 85 | 25 |
| 90 | 25 |
| COMPOUND 45 TO THE RIGHT | 24 |
| COMPOUND 45 TO THE LEFT | 24 |

| DEGREES | PERCENT OF RATING |
|---|---|
| 0 | 100 |
| 5 - 30 | 90 |
| 36 | 66 |
| 40 | 46 |
| 45 | 34 |
| 50 | 27 |
| 55 | 22 |
| 60 | 18 |
| 65 | 16 |
| 70 | 15 |
| 75 | 13 |
| 80 | 12 |
| 85 | 12 |
| 90 | 12 |

| DEGREES | PERCENT OF RATING |
|---|---|
| 0 | 100 |
| 5 - 25 | 90 |
| 30 - 45 | 75 |
| 50 | 55 |
| 55 | 45 |
| 60 | 40 |
| 65 | 35 |
| 70 | 35 |
| 75 | 30 |
| 80 | 30 |
| 85 | 25 |
| 90 | 25 |
| COMPOUND 45 TO THE RIGHT | 24 |
| COMPOUND 45 TO THE LEFT | 24 |

| DEGREES | PERCENT OF RATING |
|---|---|
| 0 | 100 |
| 5 – 25 | 90 |
| 30 – 45 | 75 |
| 50 | 55 |
| 55 | 45 |
| 60 | 40 |
| 65 | 35 |
| 70 | 35 |
| 75 | 30 |
| 80 | 30 |
| 85 | 25 |
| 90 | 25 |

NOTIFICATION APPLIANCE AND METHOD THEREOF

CROSS REFERENCE TO RELATED APPLICATION

This application claims priority under 35 U.S.C. §119(e) to U.S. Provisional Patent Application No. 61/226,121, filed on Jul. 16, 2009, by Richard T. Fish, Jr. et al., the entire disclosure of which is hereby incorporated herein by reference.

FIELD OF THE INVENTION

The present invention generally relates to a notification appliance and a method thereof, and more particularly, a notification appliance configured to emit a notification output based upon at least one detected environmental condition and a method thereof.

BACKGROUND OF THE INVENTION

Generally, a notification system notifies a person of an emergency situation that is detected. A notification system that is capable of notifying a person of multiple emergency situations typically contains a plurality of lighting sources that illuminate or emit light at different colors, wherein separate wiring and power supplies are used for each group of lighting sources. By requiring separate wiring and power supplies for each lighting source of a different color, the installation of a notification system can become more expensive and complex. Additionally, due to the increase in emergency situations in which people must be notified (e.g., fire, hazardous weather, terrorist attack, etc.) it is becoming more important for the notification system to include different color lighting sources.

Generally, smoke detectors detect the presence of smoke particles as an early indication of fire. Smoke detectors are typically used in closed structures such as houses, hotels, motels, dormitory rooms, factories, offices, shops, ships, aircraft, and the like. Smoke detectors may include a chamber that admits a test atmosphere while blocking ambient light. A light receiver within the chamber can receive a level of light from an emitter within the chamber, which light level is indicative of the amount of smoke contained in the test atmosphere. Detection of the smoke typically causes the light source to flash utilizing the predetermined flash period.

SUMMARY OF THE INVENTION

According to one aspect of the present invention, a notification appliance configured to emit a notification output based upon at least one detected environmental condition includes a sensor configured to detect the at least one environmental condition, at least one light emitting diode (LED) light source configured to emit light having an intensity during a pulse time period, and a controller in communicative connection with the sensor and the LED light source, wherein the controller is configured to control the LED light source so that the pulse time period is approximately less than or equal to two hundred milliseconds (200 ms), while substantially maintaining an effective intensity and enhancing a perceived brightness of the emitted light.

According to another aspect of the present invention, a notification appliance configured to emit a notification output based upon at least one detected environmental condition includes a sensor configured to detect the at least one environmental condition, at least one light source configured to emit light, an ambient light sensor configured to detect ambient light in an area proximate the notification appliance, and a controller in communicative connection with the sensor, the at least one light source, and the ambient light sensor, wherein the controller is configured to alter at least one characteristic of the light emitted by the at least one light source as a function of the ambient light detected by the ambient light sensor.

According to yet another aspect of the present invention, a notification appliance configured to emit a notification output based upon at least one detected environmental condition includes a sensor configured to detect the at least one environmental condition, at least one light source configured to emit light as a function of the at least one environmental condition, an at least partially transparent substrate, and a projection light source in optical communication with the at least partially transparent substrate, wherein the projection light source is configured to emit light, at least a portion of the emitted light propagating through the at least partially transparent substrate to project an image on a surface adjacent the notification appliance.

According to another aspect of the present invention, a notification appliance configured to emit a notification output based upon at least one detected at least one environmental condition is provided that includes a sensor configured to detect the at least one environmental condition, at least one light emitting diode (LED) light source configured to emit light, and an optic pack in optical communication with the at least one LED light source, wherein the optic pack includes a collimator and an outer lens in optical communication with the collimator, wherein at least one of the collimator and outer lens includes Fresnel optics, such that the optic pack is configured to project the emitted light in an illumination pattern that substantially complies with UNDERWRITERS LABORATORY™ (UL) 1971.

BRIEF DESCRIPTION OF THE DRAWINGS

The present invention will now be described, by way of example, with reference to the accompanying drawings, in which.

DETAILED DESCRIPTION

Figure 1:
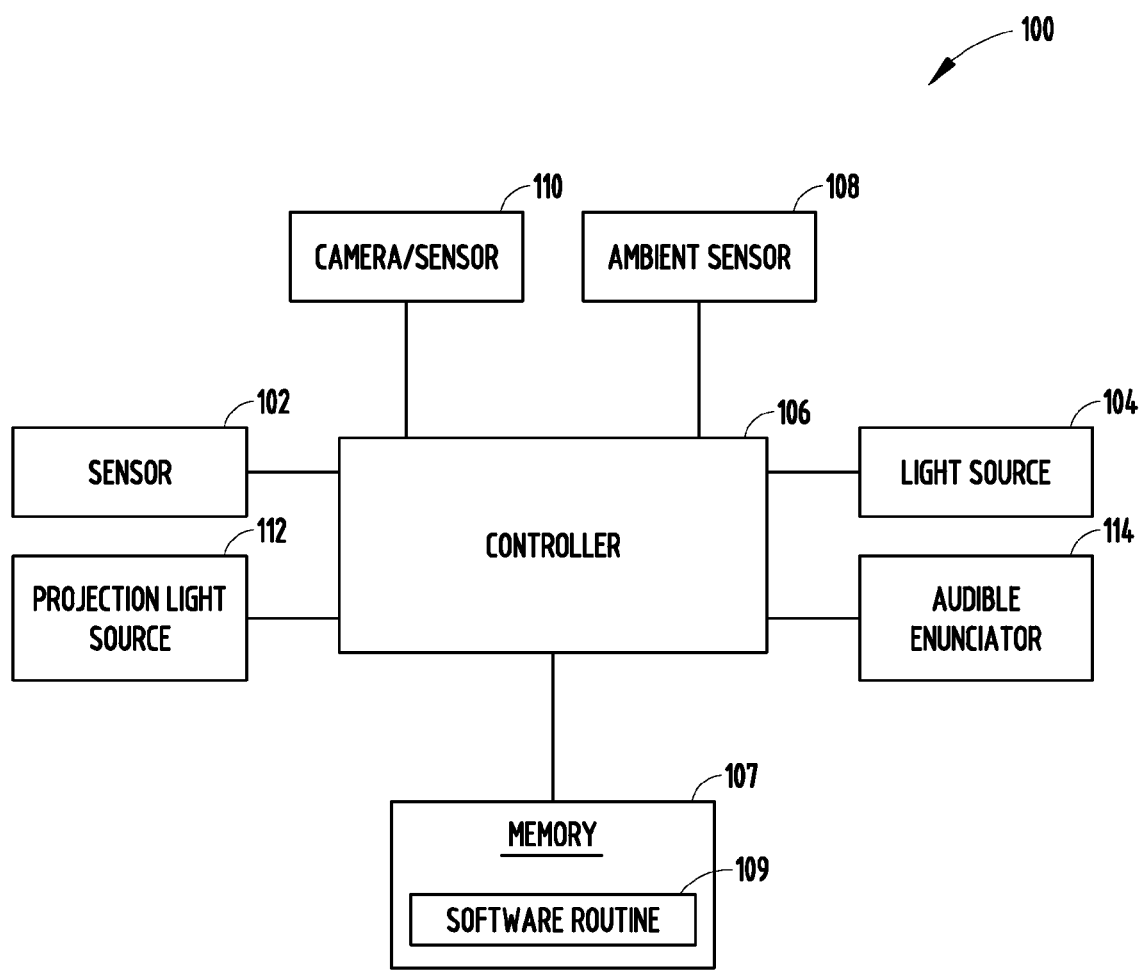
FIG. 1 is a block diagram of a notification appliance, in accordance with one embodiment of the present invention.
Figures 2A, 2B:
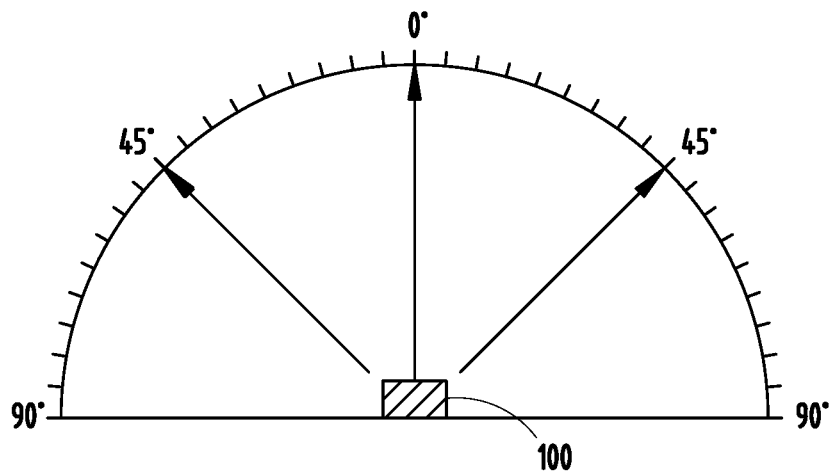
FIG. 2A is an illustration of an exemplary horizontal illumination pattern of light emitted by at least one light source of a notification appliance mounted on a wall, in accordance with one embodiment of the present invention.
FIG. 2B is a data table corresponding to the exemplary horizontal illumination pattern illustrated in FIG. 2A.
Figures 3A, 3B:
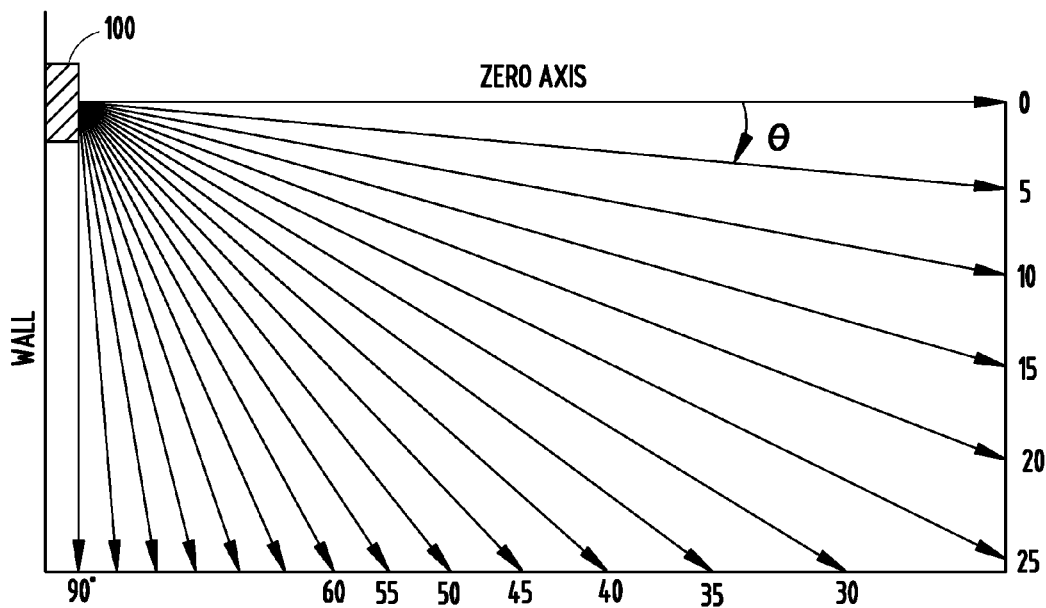
FIG. 3A is an illustration of an exemplary vertical illumination pattern of light emitted by at least one light source of a notification appliance mounted on a wall, in accordance with one embodiment of the present invention.
FIG. 3B is a data table corresponding to the exemplary vertical illumination pattern illustrated in FIG. 3A.
Figures 4A, 4B:
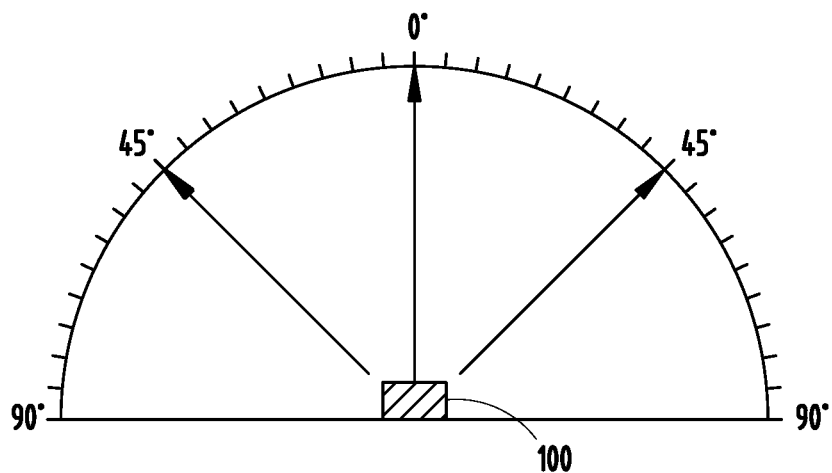
FIG. 4A is an illustration of exemplary horizontal illumination pattern of light emitted by at least one light source of a notification appliance mounted on a ceiling, in accordance with one embodiment of the present invention.
FIG. 4B is a data table corresponding to the exemplary horizontal illumination pattern illustrated in FIG. 4A.
Figures 5A, 5B:
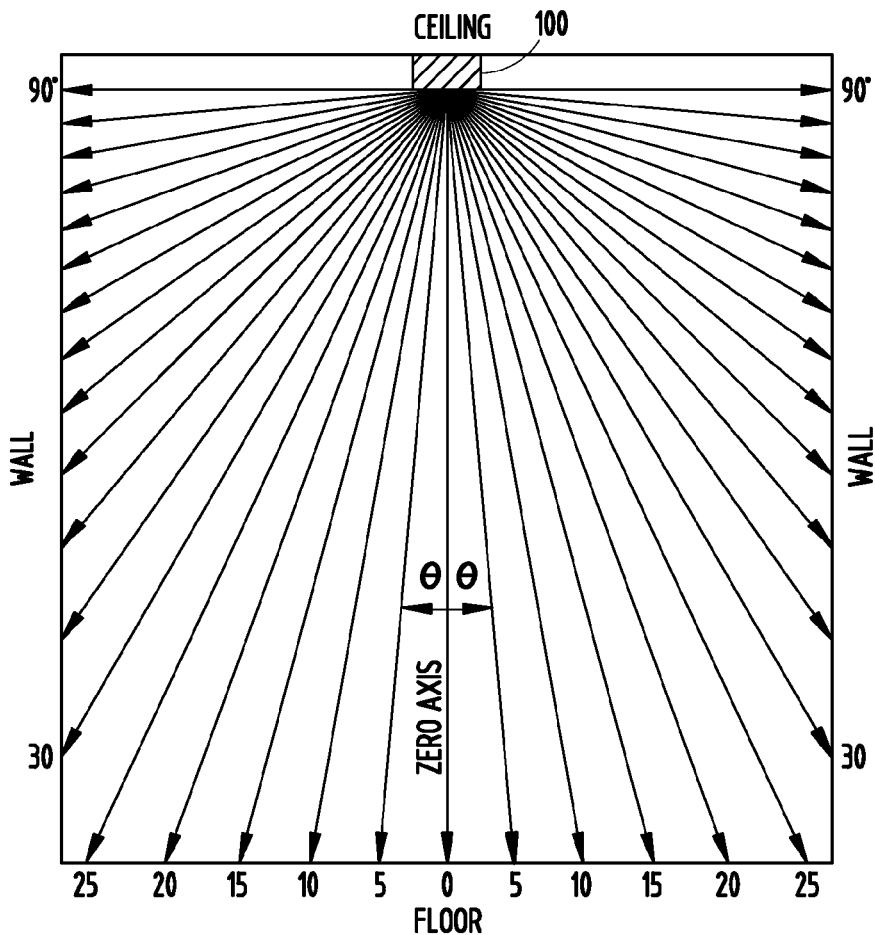
FIG. 5A is an illustration of an exemplary vertical illumination pattern of at least one light source of a notification appliance mounted on a ceiling, in accordance with one embodiment of the present invention.
FIG. 5B is a data table corresponding to the exemplary vertical illumination pattern illustrated in FIG. 5A.

Reference will now be made in detail to present embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as shown in the drawings. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

With respect to FIG. 1, a notification appliance configured to emit a notification output based upon at least one detected environmental condition is generally shown at reference identifier 100. The notification appliance 100 can include a sensor 102 configured to detect the at least one environmental condition, and at least one light source 104 configured to emit light having an intensity during a pulse time period. The at least one light source 104 can be an at least one light emitting diode (LED), according to one embodiment; however, it should be appreciated that other suitable light sources can be used alone, or in combination with, one or more LEDs.

The notification appliance 100 can further include a controller in communicative connection with the sensor and the light source 104, wherein the controller is configured to control the light source 104. According to one embodiment, the pulse time period is approximately less than or equal to two hundred milliseconds (200 ms), while substantially maintaining an effective intensity and enhancing a perceived brightness of the emitted light, as described in greater detail herein. Typically, the controller 106 controls the light source 104 to emit light during pulse time periods with an intensity as a function of ambient surroundings of the notification appliance 100, so as to maintain an effective intensity and enhance a perceived brightness of the emitted light. In such an embodiment, the controller 106 may not be pre-programmed to control the light source 104 to emit light at only a single pulse time period interval or at a single intensity, but instead, the controller 106 can dynamically alter a pulse time period of emitted light, an intensity of emitted light, or a combination thereof.

The notification appliance 100 can include the sensor 102 which detects an environmental condition proximate the notification appliance. In such an embodiment, the notification appliance 100 can include a smoke detector, a carbon monoxide detector, a carbon dioxide detector, a fire detector, the like, or a combination thereof. Alternatively, the sensor 102 configured to detect at least one environmental condition is a device that receives a signal from a system that includes the notification appliance 100, such that the notification appliance 100 is an enunciator appliance (e.g., does not have a carbon monoxide detector, a smoke detector, or a fire detector). In such an embodiment, the detected environmental condition detected by the sensor 102 is a signal (e.g., a coded signal, a non-coded signal, or a pulse) received from another device of a system that includes the notification appliance 100, wherein such a system includes a detector device. However, it should be appreciated that in an embodiment of the notification appliance 100 that includes the sensor 102 being a detector device, the notification appliance 100 can be configured to receive a signal from another device of a system that includes the notification appliance 100.

According to one embodiment, the light source 104 can be configured to emit light during the pulse time period, and the controller 106 can be configured to set the pulse time period to range between and include approximately one millisecond (1 ms) and two hundred milliseconds (200 ms). Alternatively, the controller 106 can be configured to set the pulse time period of the emitted light to range between and include approximately twenty five milliseconds (25 ms) and one hundred seventy-five milliseconds (175 ms). According to an alternate embodiment, the controller 106 can be configured to set the pulse time period of the emitted light to range between and include approximately seventy five milliseconds (75 ms) and one hundred milliseconds (100 ms). Such exemplary pulse durations or pulse time periods are illustrated in FIGS. 6-12B with respect to an intensity of the emitted light, which are described in greater detail below. Typically, the controller 106 can alter the time period of the emitted light to maintain an effective intensity while enhancing a perceived brightness of the emitted light. Thus, the controller 106 can be in communicative connection with a memory device 107 that includes one or more executable software routines 109, such that the controller 106 can control the light emitted by the light source 104 as a function of the one or more executable software routines 109.

The notification appliance 100 can include an ambient light sensor 108, according to one embodiment. The ambient light sensor 108 can be configured to detect ambient light in an area proximate the notification appliance 100. Thus, the ambient light sensor 108 can be integrated in the notification appliance 100, so that the ambient light sensor 108 can detect the ambient light. The controller 106 can be configured to alter the light emitted by the light source 104 as a function of the detected ambient light. In such an embodiment, the controller 106 can alter the pulse time period as a function of the detected ambient light to maintain an effective intensity while enhancing a perceived brightness of the emitted light.

In an embodiment of the notification appliance 100 that includes the ambient light sensor 108, the controller 106 can be configured to control the light source 104 to substantially constantly emit light as a function of the detected ambient light by the ambient light sensor 108 being below a threshold value. By way of explanation and not limitation, the threshold value can be based upon an amount of ambient light when it is desirable to provide additional illumination to enhance vision of a human eye. In such an embodiment, the light source 104, a different light source, or a combination thereof, can be a night light that emits light at an intensity and an illumination pattern when an environmental condition is not detected by the sensor 102, and the controller 106 can then control the light source 104 to emit light when an environmental condition is detected by the sensor 102. Typically, an intensity, an illumination pattern, spectral characteristic, the like, or a combination thereof, of emitted light when an environmental condition is not detected differs from an intensity, an illumination pattern, spectral characteristic, the like, or a combination thereof, of emitted light when an environmental condition is detected; however, it should be appreciated that an intensity, an illumination pattern, spectral characteristic, the like, or a combination thereof, may be substantially the same when an environmental condition is and is not detected by the sensor 102.

Additionally or alternatively, the controller 106 can be configured to alter at least one of an intensity of light emitted by the light source 104, a pulse time period or duration of light emitted by the light source 104 (e.g., FIGS. 6-12B), a spectral characteristic of light emitted by the light source 104 (e.g., FIGS. 2A-5B, 13, and 14), a pulse signature of light emitted by the light source 104 (e.g., FIGS. 6-12B), a spectral output of light emitted by the light source 104, an illumination pattern of the light emitted by the light source 104 (e.g., FIGS. 2A-5B, 13, and 14), the like, or a combination thereof, while maintaining effective intensity and enhancing the perceived brightness of emitted light. According to one embodiment, the above exemplary characteristics can be altered by the controller 106 as a function of the detected ambient light by the ambient light sensor 108, the at least one detected environmental condition, the like, or a combination thereof. For purposes of explanation and not limitation, altering the pulse signature can include altering a common multi-pulse (e.g., FIGS. 9A and 9B), a variable multi-pulse (FIGS. 10A and 10B), a common hyper-pulse (e.g., FIGS. 11A and 11B), a variable hyper-pulse (e.g., FIGS. 12A and 12B), the like, or a combination thereof.

In an embodiment of the notification appliance 100 that includes an ambient light sensor 108, the controller 106 can be configured to control an intensity of emitted light during a pulse time period or a pulse time period as a function of the detected ambient light by the ambient light sensor 108 to maintain substantially the same effective intensity while enhancing the perceived brightness of the light emitted by the light source 104. Alternatively, the controller 106 can be configured to control an intensity of emitted light and a pulse time period of the emitted light as a function of the detected ambient light by the ambient light sensor 108 to maintain substantially the same effective intensity of the light emitted by the light source 104. However, it should be appreciated that the intensity of the emitted light, the pulse time period of the emitted light, or a combination thereof can be altered by the controller 106 without relation to ambient light, or a combination of detected ambient light and other conditions relating to and/or in proximity of the notification appliance 100.

For purposes of explanation and not limitation, an effective intensity can be calculated by any of the following three equations:

$$I_{eff} = \frac{\int_{t_1}^{t_2} I(t)\,dt}{a + (t_2 - t_1)} \quad \text{Equation 1}$$

$$I_{eff} = \frac{\int_0^T I(t)\,dt}{a + \Delta T} \quad \text{Equation 2}$$

$$\frac{di(t)}{dt} = \frac{I(t) - i(t)}{a} \quad \text{Equation 3}$$

Additionally, Underwriters Laboratory (UL) 1971 calculates light output in candelas by the following equation:

$$I_e = d^2 \left[ \frac{\int_{t_1}^{t_2} I\,dt}{0.2 + (t_2 - t_1)} \right]; \quad \text{Equation 4}$$

wherein d is a distance from a light sensor to a lens in feet, 0.2 is a nighttime threshold value for a steady light, $t_2 - t_1$ is a light pulse duration, as measured between ten percent (10%) of peak amplitude for leading and trailing edges of a light wave envelope in seconds, and $\int_{t_1}^{t_2} I\,dt$ is a total value of luminous intensity measured. Thus, Equation 4 considers both peak intensity and the pulse time period (e.g., a direction of a flash of the light source 104). Based upon Equation 4, a fifteen candela (15 cd) UL 1971 setting can have a substantially similar effective intensity while enhancing the perceived brightness at an approximately one millisecond (1 ms) pulse time period and high peak intensity at an approximately two hundred millisecond (200 ms) pulse time period and lower peak intensity.

Figure 30:
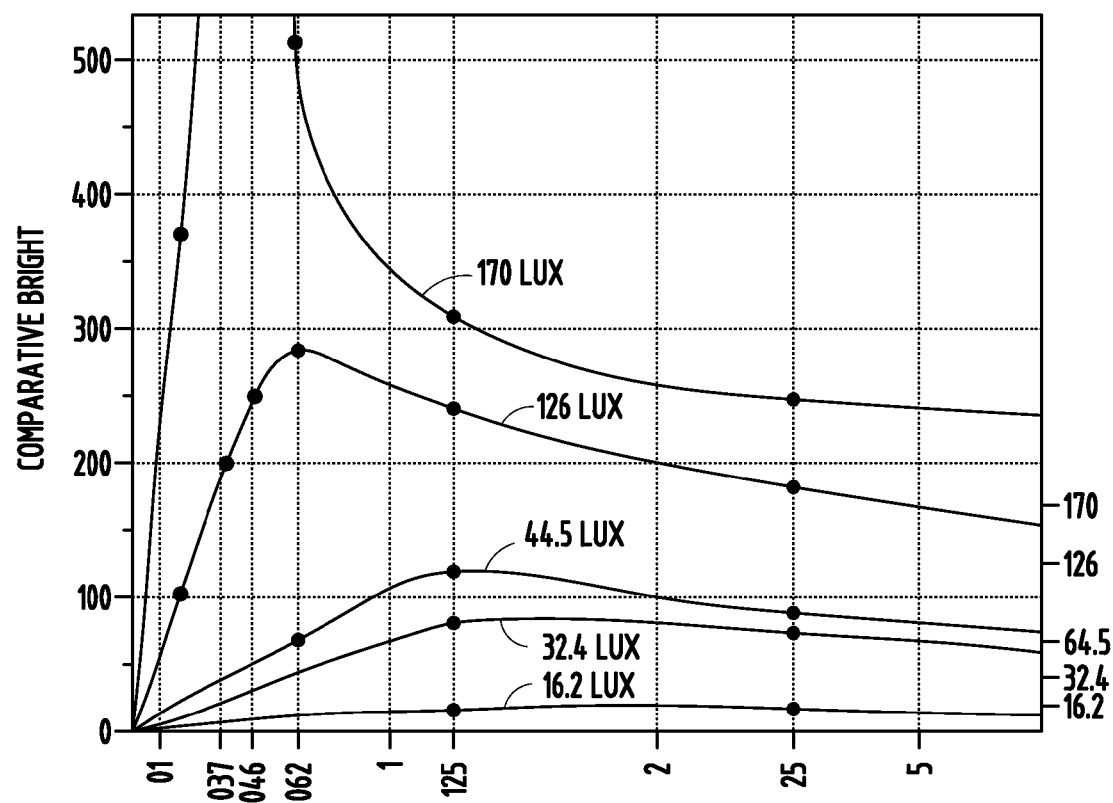
FIG. 30 is a chart illustrating apparent brightness of flashes with various luminance as a function of flash direction.

In addition to basic discrimination characteristics of temporal resolution (e.g., Bloch's Law), there can be other perceptual phenomena. One of these phenomena is the Broca-Sulzer effect that describes apparent transient increase in brightness of a flash of short duration. As illustrated in FIG. 30, a subjective flash brightness can occur with a flash duration of fifty to one hundred milliseconds (50 ms-100 ms), wherein the Broca-Sulzer phenomena is associated with temporal summation that explains the leveling off of brightness to a plateau. When a light source is turned ON, a greater amount of time is needed for temporal summation to reach a threshold for light of low luminance, when compared to light of high luminance, which reaches its threshold quicker. As a flash duration increases, brightness levels off to a plateau as a temporal summation can begin to break down according to Bloch's Law after a critical duration. Apparent transient peak in brightness is typically due to an underlying neuromechansim. Thus, an effective intensity of a flash can be substantially linear to approximately seventy five milliseconds (75 ms), and then flatten out.

Accordingly, a light with approximately the same intensity can have a perceived brightness to a pupil of an eye that is greater if a flash duration is longer. One exemplary scenario in a dark room is that a peak intensity is significantly higher (e.g., 0.0074 ms pulse/222,000 trolands intensity vs. 0.234 ms pulse/7,030 trolands intensity) to get the same pupil response, which indicates a 0.0074 ms pulse needs a peak intensity of approximately 32 times a 0.234 ms pulse to get substantially the same response for the pupil. Such a phenomena is discussed in Alpern et al., *The Dependence of the Photopupil Response on Flash Duration and Intensity*, JOURNAL OF GENERAL PHYSIOLOGY, vol. 47, pp. 265-278, The Rockefeller University Press 1963, the entire journal hereby being incorporated herein by reference.

With respect to eye or brain response times, a flash typically is present for at least ten milliseconds (10 ms) to be perceived at full brilliance. Thus, a two millisecond (2 ms) flash can appear at approximately one-fifth (⅕) a perceived brightness than a peak intensity. Such a phenomena is described in the Markston, R. M., *Optoelectronic Circuits Manual*, NEWNES, p. 35 and 36, ($2^{nd}$ ed. 2009), the entire reference hereby being incorporated herein by reference.

Other references that discuss flash duration and peak response times are Bowman et al., *Waking effectiveness of visual alerting signals*, JOURNAL OF REHABILITATION RESEARCH AND DEVELOPMENT, vol. 32, no. 1, pp. 43-54 (February 2005) and Cote, Arthur E., *Operation of Fire Protection Systems*, NATIONAL FIRE PROTECTION ASSOCIATION, Jones and Bartlett Publishers (2003), these entire references hereby being incorporated herein by reference.

Typically, the controller 106 alters the intensity and the pulsed time period as a percentage of one another. One exemplary scenario can be an approximately one millisecond (1 ms) pulse having approximately one hundred (100) times an intensity as a two hundred millisecond (200 ms) pulse. Thus, as illustrated in FIG. 5, the above exemplary scenario can result in an area under both curves (e.g., intensity at one millisecond (1 ms) and intensity at two hundred milliseconds (200 ms)) being approximately the same.

Figure 6:
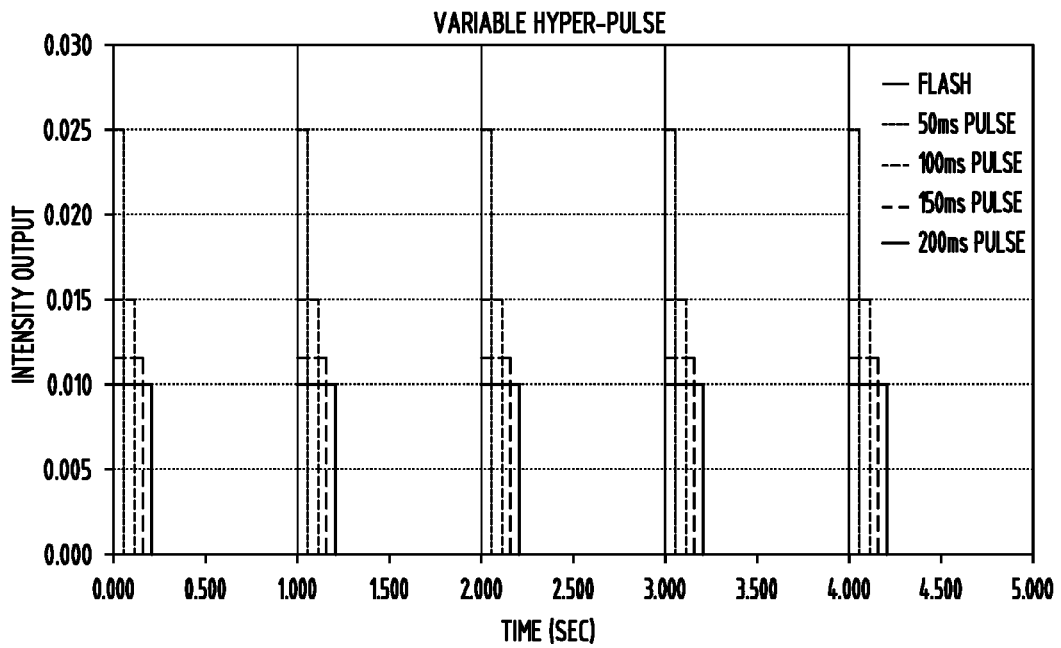
FIG. 6 is a chart illustrating a percent intensity output with respect to a time duration of a flash having various exemplary pulse time periods, in accordance with one embodiment of the present invention.
Figure 7:
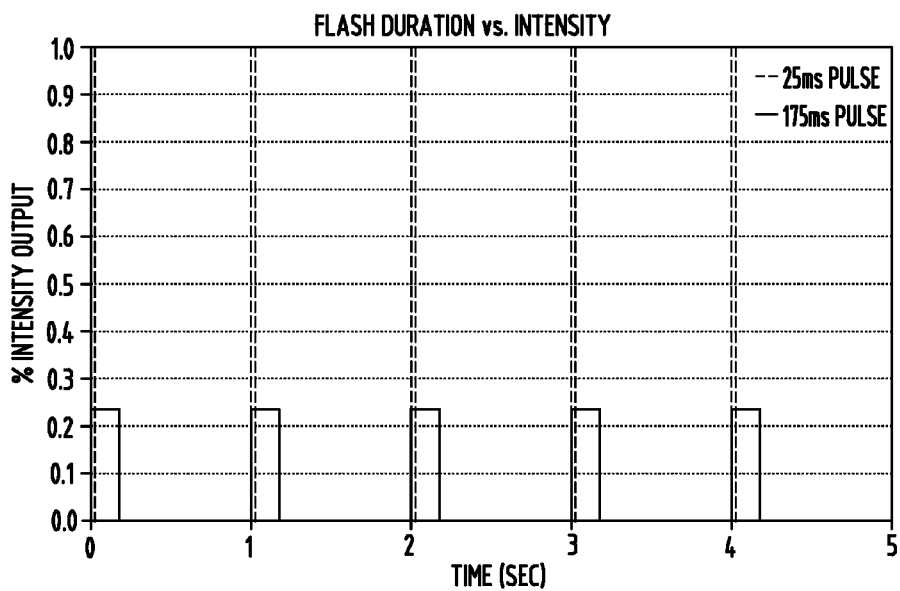
FIG. 7 is a chart illustrating a percent intensity output with respect to a time duration of a flash having various exemplary pulse time periods, in accordance with one embodiment of the present invention.
Figure 8:
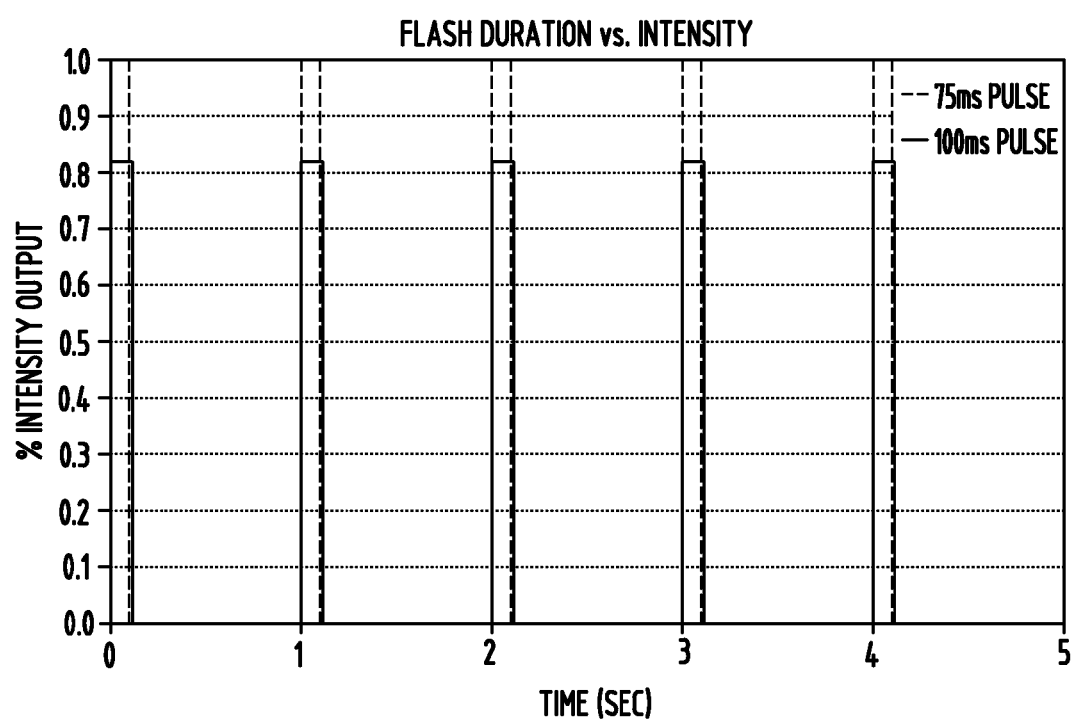
FIG. 8 is a chart illustrating a percent intensity output with respect to a time duration of a flash having various exemplary pulse time periods, in accordance with one embodiment of the present invention.

Similarly, as illustrated in FIG. 6, an approximately fifty millisecond (50 ms) pulse can have approximately two and a half (2½) times an intensity of an approximately two hundred millisecond (200 ms) pulse, an approximately one hundred millisecond (100 ms) pulse can have approximately one and a half (1½) times an intensity of an approximately two hundred millisecond (200 ms) pulse, and an approximately one hundred fifty millisecond (150 ms) pulse can have approximately 1.167 times an intensity of an approximately two hundred millisecond (200 ms) pulse. As illustrated in FIG. 7, an approximately twenty five millisecond (25 ms) pulse can have approximately four (4) times an intensity of an approximately one hundred seventy-five millisecond (175 ms) pulse. With respect to FIG. 8, an approximately seventy five millisecond (75 ms) pulse can have approximately one and a quarter (1¼) times an intensity of an approximately one hundred millisecond (100 ms) pulse. Thus, the areas under the curves illustrated in FIGS. 6-8 can be approximately the same, indicating that an effective intensity is maintained while enhancing a perceived brightness of emitted light.

According to one embodiment, the notification appliance 100 can include a camera/sensor 110 in addition to or alternatively from the ambient light sensor 108. In an embodiment that includes the camera/sensor 110, but not an ambient light sensor 108, the camera/sensor 110 can function similar to how the ambient light sensor 108 functions, as described herein. Thus, the camera/sensor 110 can detect ambient surroundings of the notification appliance 100. In either embodiment, by way of explanation and not limitation, the camera/sensor 110 can be a red-green-blue (RGB) camera or RGB Ambient Light Sensor (ALS), such that the camera/sensor 110 can be configured to determine a color of a room that the notification appliance 100 is located. In such an embodiment, the camera/sensor 110 determines that the surfaces of wall(s) of a room that the notification appliance 100 is located in are red, then the controller 106 can alter the spectral characteristics of the light emitted by the light source 104 to increase the perception of the emitted light by a person within view of the light source 104. One exemplary spectral characteristic that can be altered in such an embodiment is the light source 104 will emit light having a wavelength that appears red, since the wall and/or ceiling surfaces of the room are also red.

According to one embodiment, the controller 106 can alter the light emitted by the light source 104 during an ON pulse period. Typically, the light source 104 is controlled by the controller 106 during the ON pulse period to common multi-pulse, variable multi-pulse, common hyper-pulse, variable multi-pulse, or a combination thereof. By way of explanation and not limitation, the ON pulse period can be approximately one hundred seventy-five milliseconds (175 ms), such that during a one hundred seventy-five millisecond (175 ms) pulse time period, the controller 106 can control the light emitted by the light source 104 to alter intensities, alter the spectral characteristics, alter a pulse signature, the like, or a combination thereof. Thus, the controller 106 can be configured to alter an intensity of emitted light during an ON pulse period, and may not only control the light source 104 to be only in an ON state or OFF state.

Figure 9A:
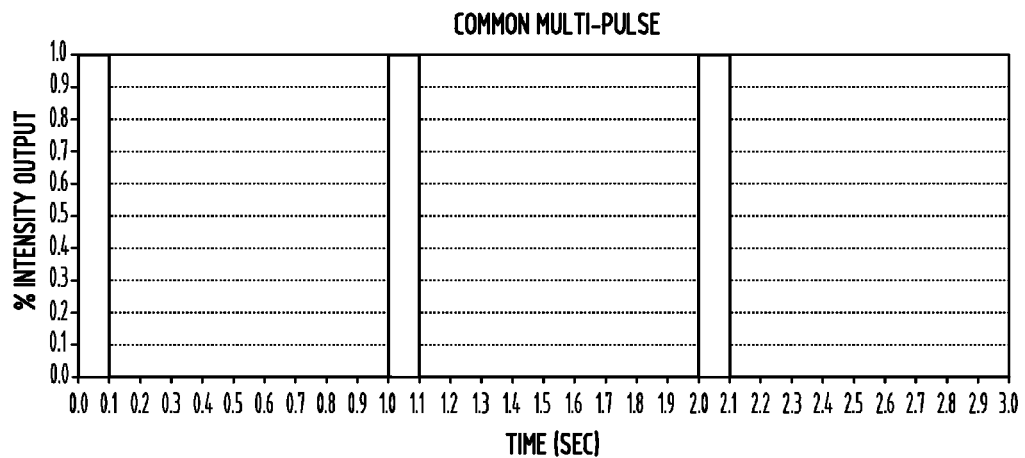
FIG. 9A is a chart illustrating a series of exemplary common multi-pulses during a period of time, in accordance with one embodiment of the present invention.
Figure 9B:
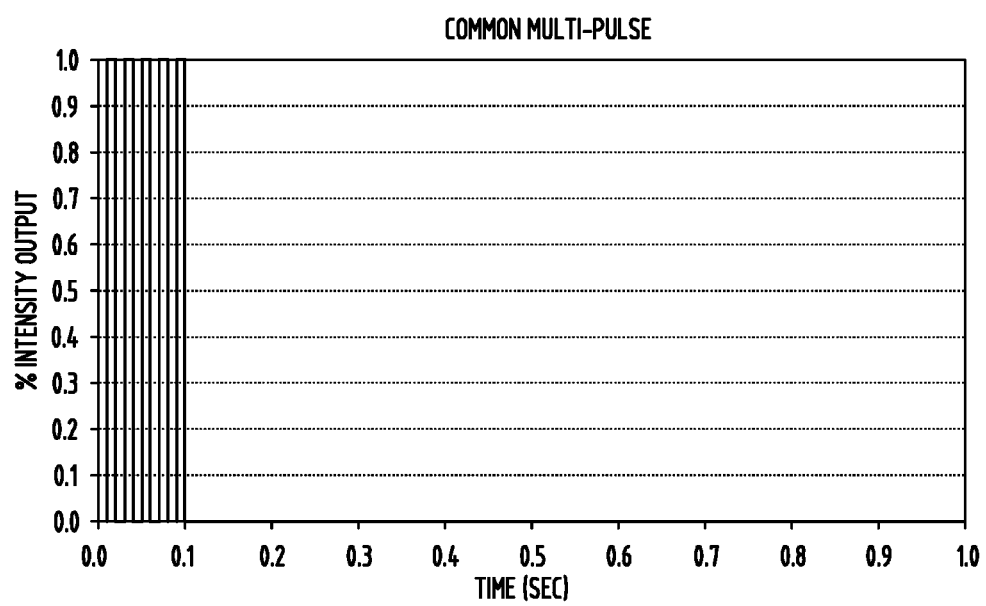
FIG. 9B is a chart illustrating an exemplary series of pulses of a common multi-pulse during a time duration, as illustrated in FIG. 9A.

In regards to FIGS. 9A and 9B, an exemplary common multi-pulse is illustrated, according to one embodiment. As shown in FIG. 9A, the common multi-pulse includes pulsing the light source 104 for one hundred milliseconds (100 ms) per one second (1 sec). As shown in FIG. 9B, the one hundred milliseconds (100 ms) pulse of FIG. 9A is illustrated, wherein the controller 106 pulses the light source 104 a plurality of times during the one hundred milliseconds (100 ms) pulse time period or ON pulse time period. It should be appreciated that FIG. 9B illustrates the light source 104 being pulsed ten (10) times during the one hundred milliseconds (100 ms) pulse period, but that any number of pulses can be used during this one hundred milliseconds (100 ms) time period. Further, it should be appreciated that the one hundred milliseconds (100 ms) pulse period and the percent intensity of the emitted light are for purposes of explanation and not limitation, such that any suitable pulse period can be utilized.

Figure 10A:
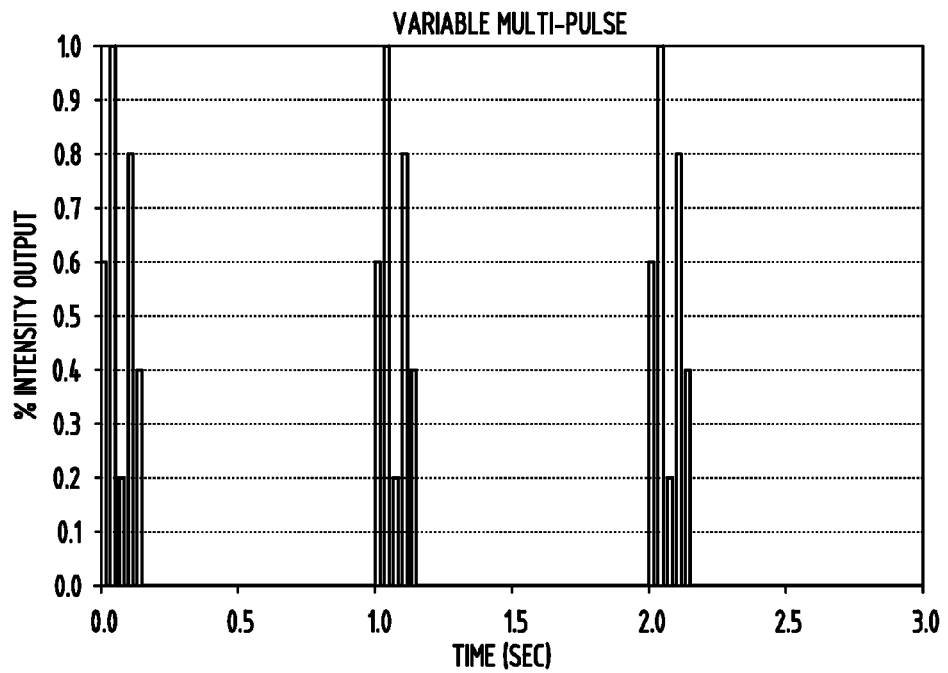
FIG. 10A is a chart illustrating a series of exemplary variable multi-pulses during a period of time, in accordance with one embodiment of the present invention.
Figure 10B:
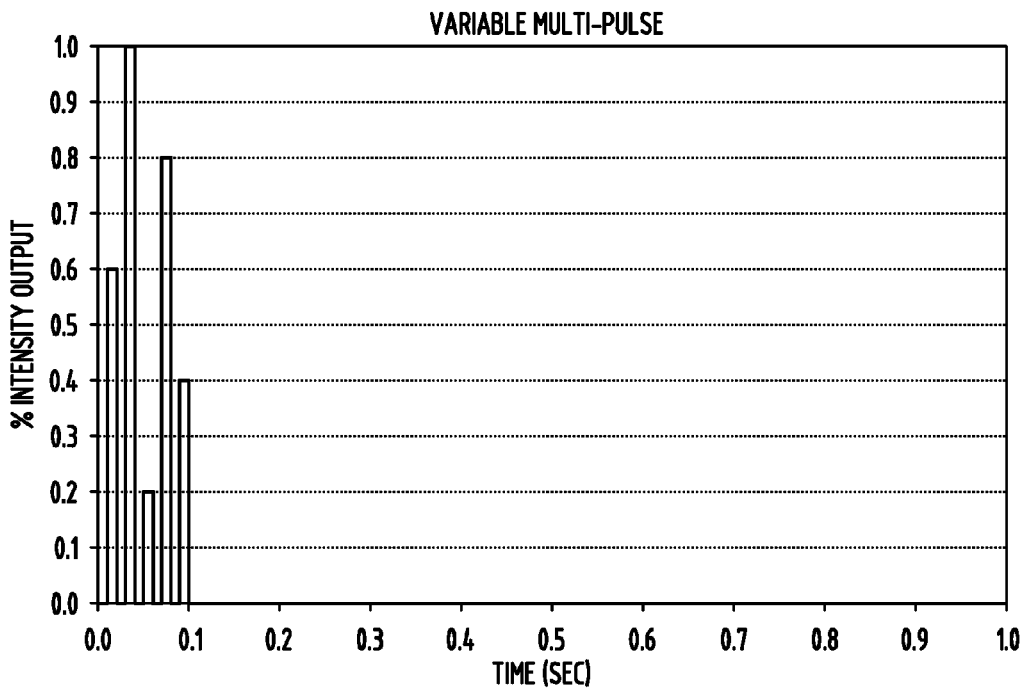
FIG. 10B is a chart illustrating an exemplary series of pulses of a variable multi-pulse during a time period, as illustrated in FIG. 10A.

With respect to FIGS. 10A and 10B, an exemplary variable multi-pulse is illustrated, according to one embodiment. As to FIG. 10A, the controller 106 can control the light source 104 to variably pulse for a one hundred milliseconds (100 ms) time period per one second (1 sec). With respect to FIG. 10B, the one hundred milliseconds (100 ms) pulse time period of FIG. 10A is illustrated, wherein an intensity of the emitted light is varied during the one hundred milliseconds (100 ms) time period. Similar to the common multi-pulse, the controller 106 can be configured to alter an intensity of emitted light during an ON pulse period, and may not only control the light source 104 to be only in an ON state or an OFF state. It should be appreciated that the intensities and the one hundred milliseconds (100 ms) time period of FIGS. 10A and 10B are for purposes of explanation and not limitation, such that any suitable intensities and pulse time periods can be utilized.

Figure 11A:
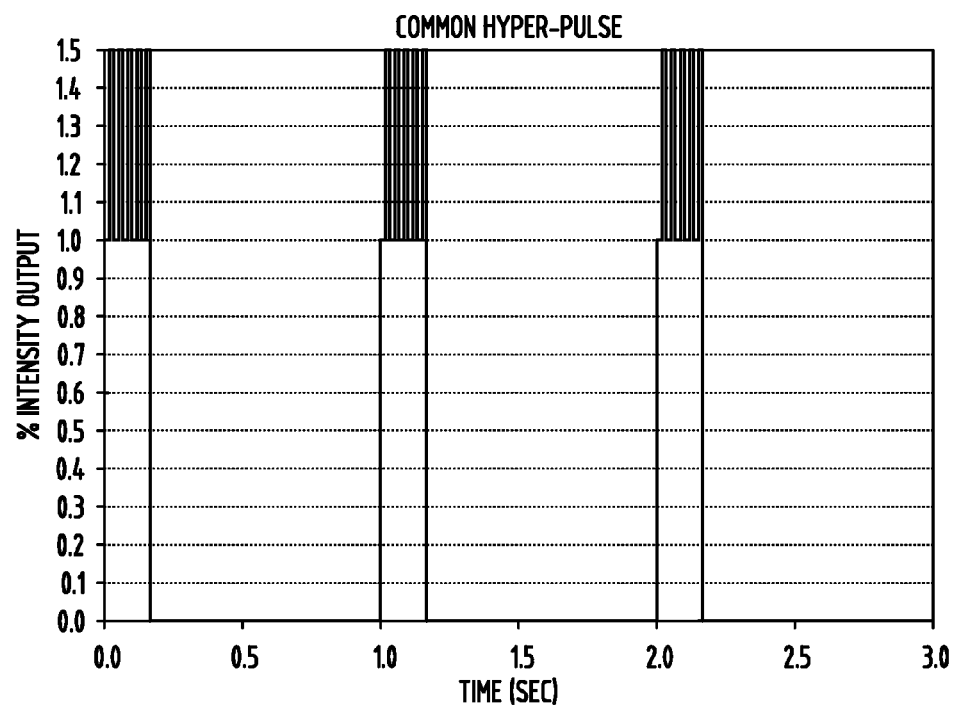
FIG. 11A is a chart illustrating a series of exemplary common hyper-pulses during a period of time, in accordance with one embodiment of the present invention.
Figure 11B:
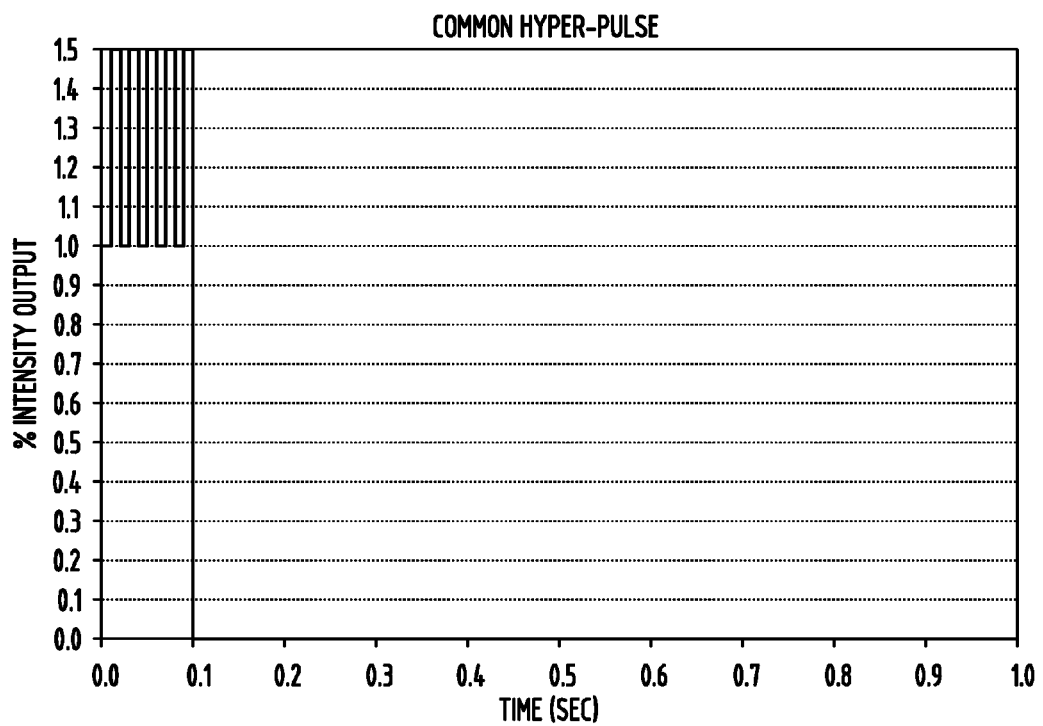
FIG. 11B is a chart illustrating an exemplary series of hyper-pulses of a common hyper-pulses during a time period, as illustrated in FIG. 11A.

In regards to FIGS. 11A and 11B, an exemplary common hyper-pulse is illustrated, according to one embodiment. As to FIG. 11A, the controller 106 can control the light source 104 to commonly hyper-pulse during a one hundred milliseconds (100 ms) common hyper-pulse time period per one second (1 sec). In regards to FIG. 11B, the one hundred milliseconds (100 ms) common hyper-pulse of FIG. 11A is shown, wherein during portions of the one hundred milliseconds (100 ms) time period, the controller 106 hyper-pulses the light source 104. Typically, a hyper-pulse is when the light source 104 emits light having an intensity greater than one hundred percent (100%) of a manufacture recommended intensity or manufacturer recommended electrical current draw. Further, it should be appreciated that the intensities and the one hundred millisecond (100 ms) time period of FIGS. 11A and 11B are for purposes of explanation and not limitation, such that any suitable intensities and pulse time period can be utilized.

Figure 12A:
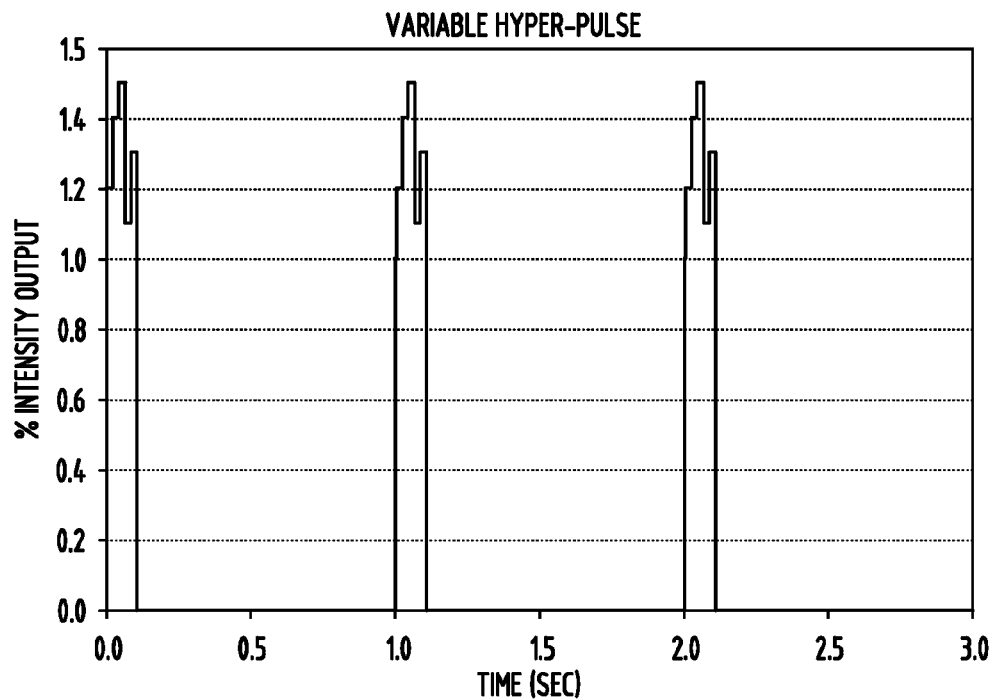
FIG. 12A is a chart illustrating a series of an exemplary variable hyper-pulses during a period of time, in accordance with one embodiment of the present invention.
Figure 12B:
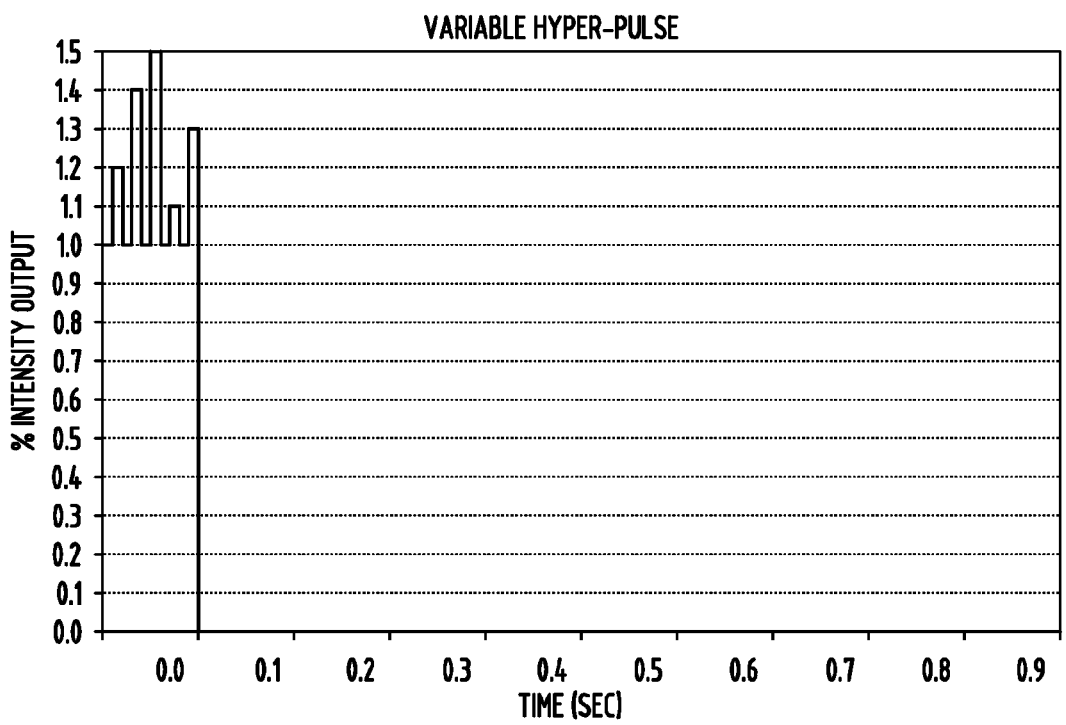
FIG. 12B is a chart illustrating an exemplary series of hyper-pulses of a variable hyper-pulse during a time period, as illustrated in FIG. 12A.
Figure 13:
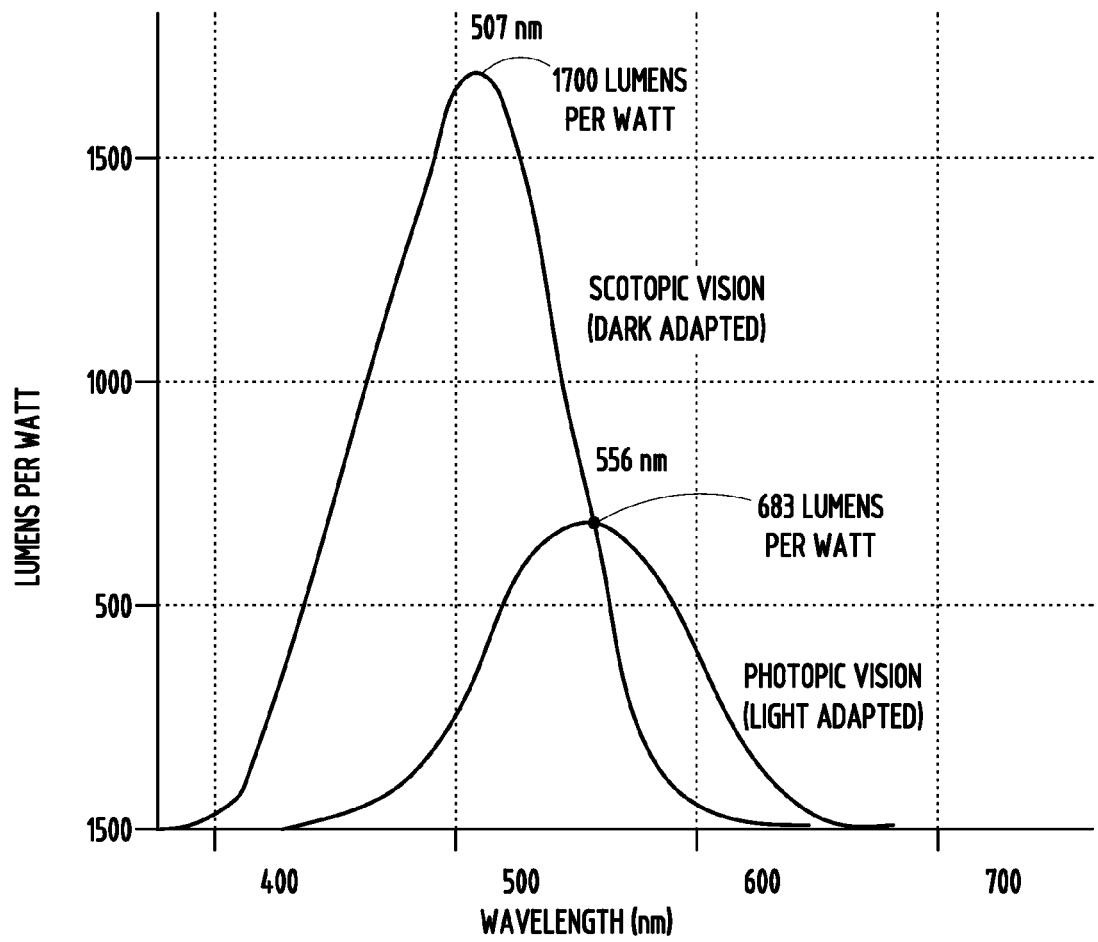
FIG. 13 is a chart illustrating lumens per watt with respect to a wavelength, in accordance with one embodiment of the present invention.
Figure 14:
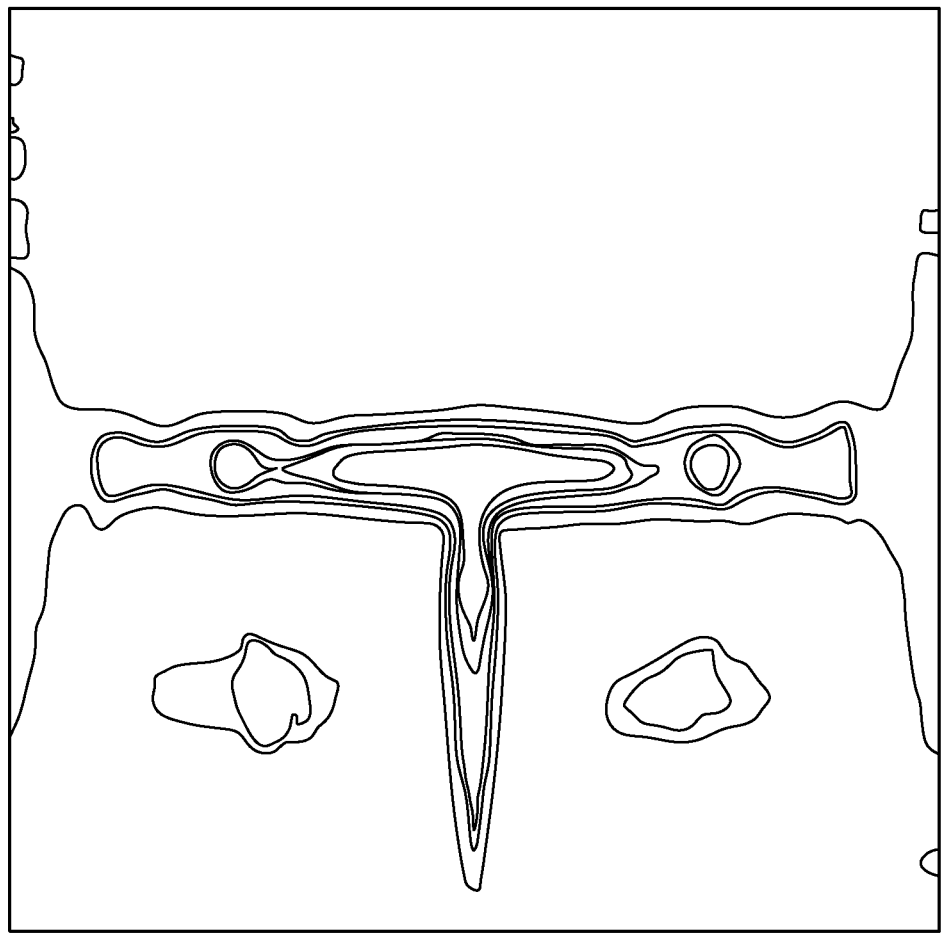
FIG. 14 is an illustration of an exemplary illumination pattern of light being emitted by at least one light source of a notification appliance, in accordance with one embodiment of the present invention.
Figure 15:
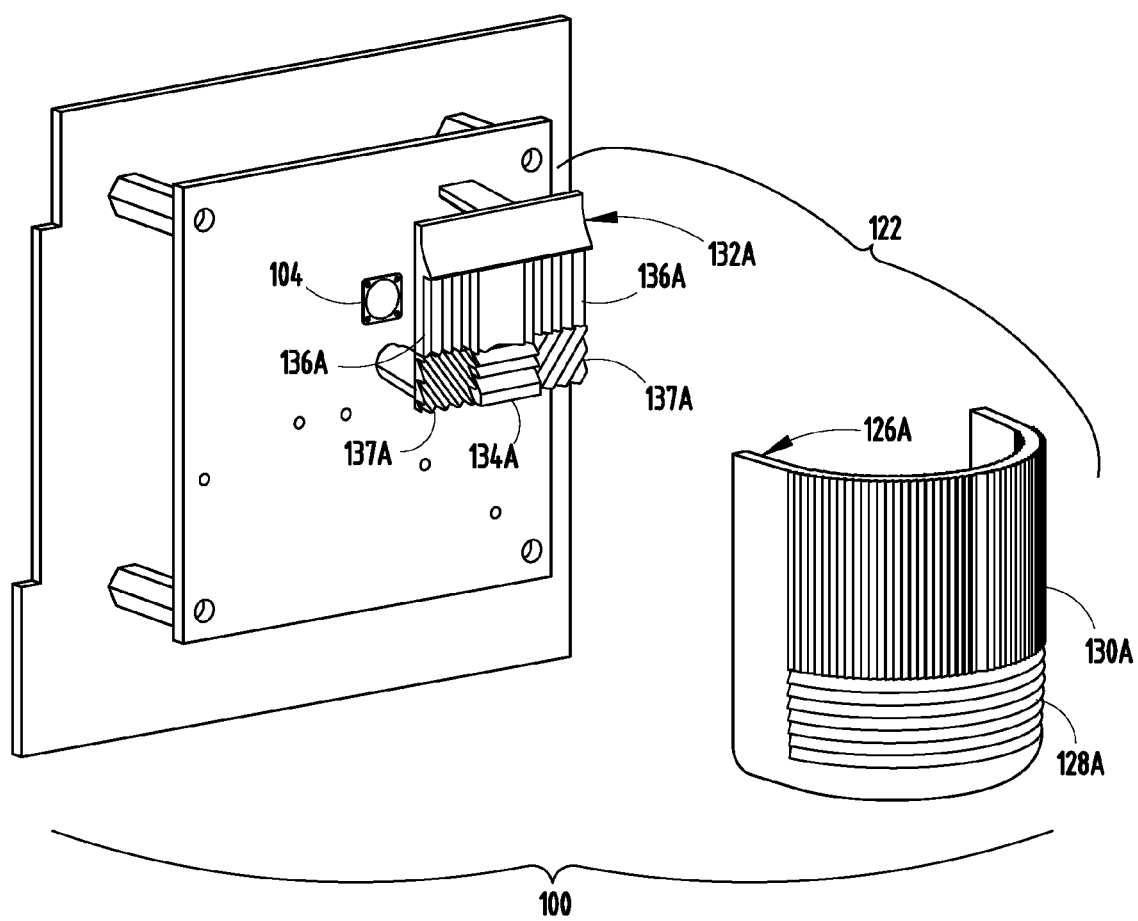
FIG. 15 is a front-side perspective exploded view of a notification appliance having an optic pack, in accordance with one embodiment of the present invention.
Figure 16A:
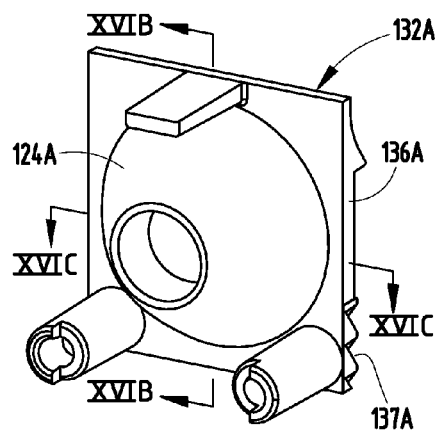
FIG. 16A is a back-side perspective view of a collimator of an optic pack of the notification appliance of FIG. 15.
Figure 16B:
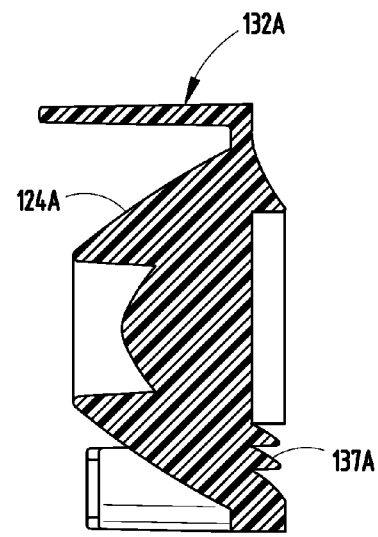
FIG. 16B is a partial cross-sectional view of the collimator along the line XVI B of FIG. 16A.
Figure 16C:
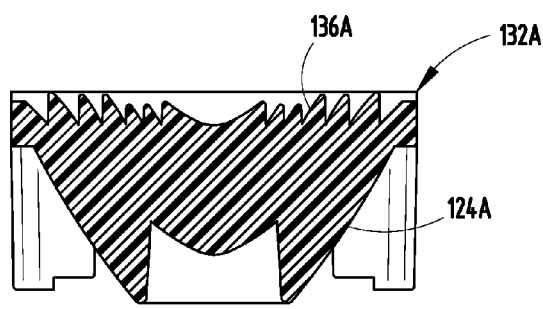
FIG. 16C is a partial cross-sectional view of the collimator along the line XVI C of FIG. 16A.
Figure 16D:
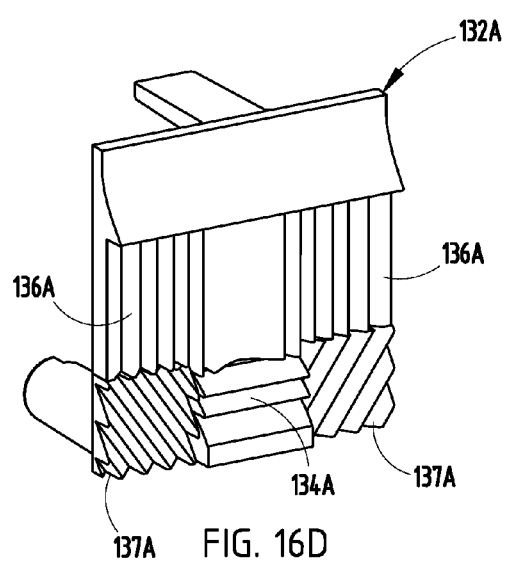
FIG. 16D is a front-side perspective view of the collimator of FIG. 16A.
Figure 17A:
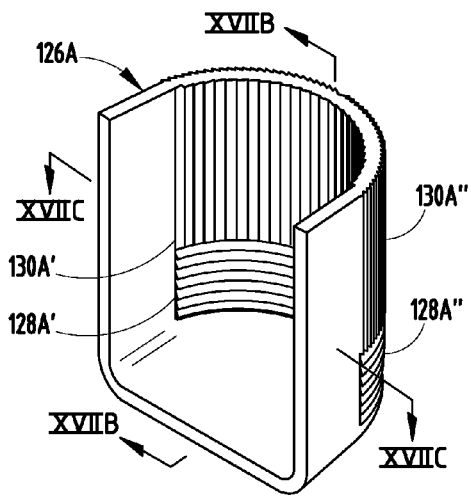
FIG. 17A is a back-side perspective view of an outer lens of an optic pack of the notification appliance of FIG. 15.
Figure 17B:
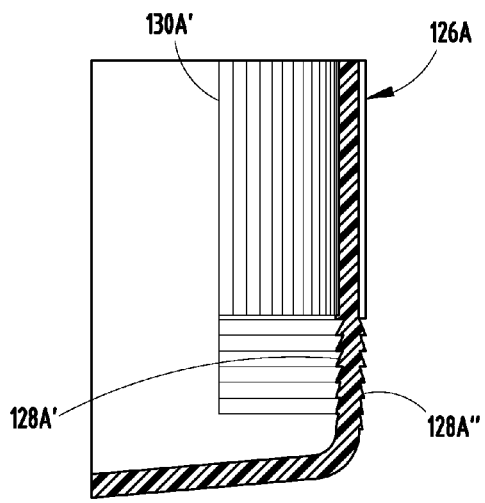
FIG. 17B is a partial cross-sectional view of the outer lens along the line XVII B of FIG. 17A.
Figure 17C:
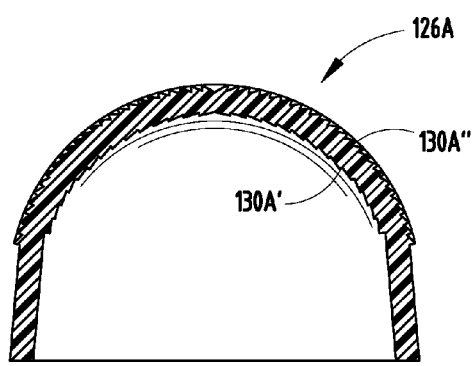
FIG. 17C is a partial cross-sectional view of the outer lens along the line XVII C of FIG. 17A.
Figure 17D:
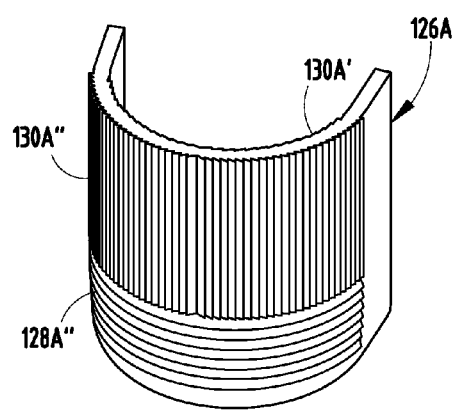
FIG. 17D is a front-side perspective view of the outer lens of FIG. 17A.
Figure 18:
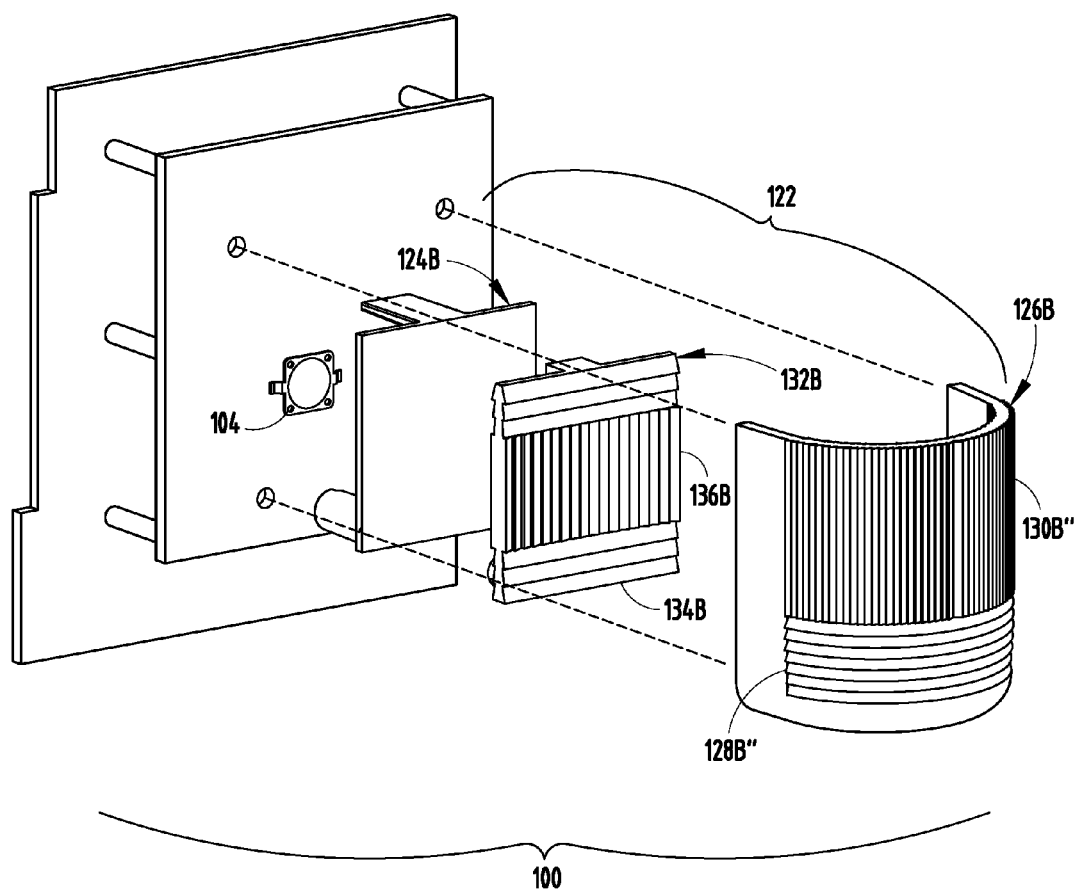
FIG. 18 is a front-side perspective exploded view of a notification appliance having an optic pack, in accordance with one embodiment of the present invention.
Figure 19A:
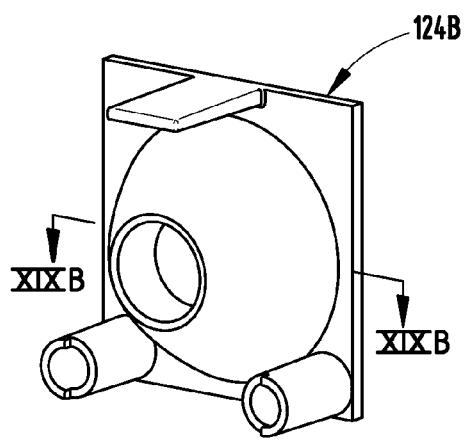
FIG. 19A is a back-side perspective view of a collimator of an optic pack of the notification appliance of FIG. 18.
Figure 19B:
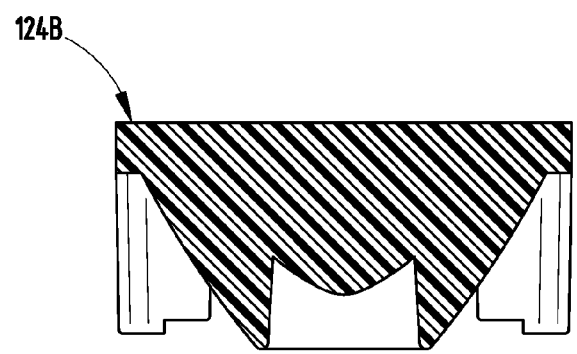
FIG. 19B is a partial cross-sectional view of the collimator along the line XIX B of FIG. 19A.
Figure 19C:
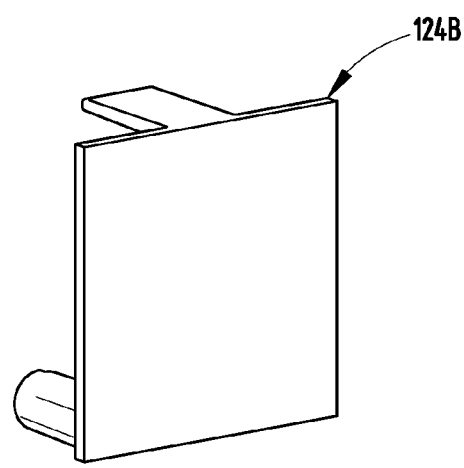
FIG. 19C is front-side perspective view of the collimator of FIG. 19A.
Figure 20A:
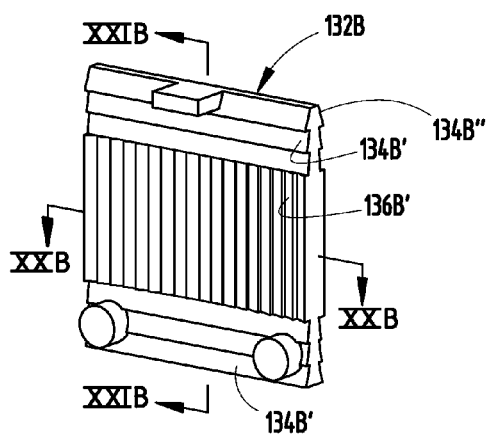
FIG. 20A is a front-side perspective view of an inner lens of an optic pack of the notification appliance of FIG. 18.
Figure 20B:
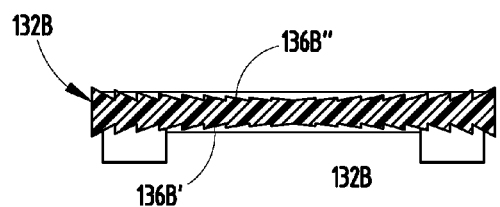
FIG. 20B is a partial cross-sectional view of the inner lens along the line XX B of FIG. 20A.
Figure 20C:
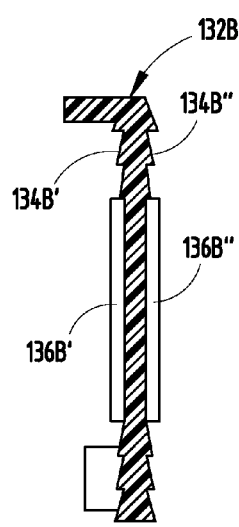
FIG. 20C is a partial cross-sectional view of the inner lens along the line XX C of FIG. 20A.
Figure 20D:
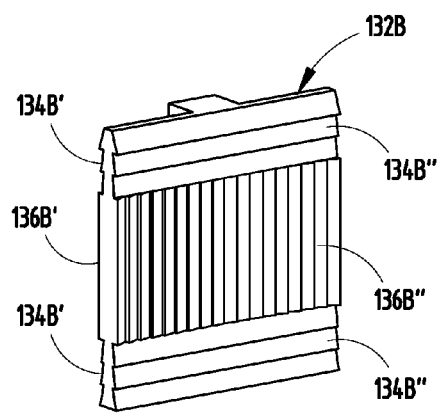
FIG. 20D is a front-side perspective view of the inner lens of FIG. 20A.
Figure 21A:
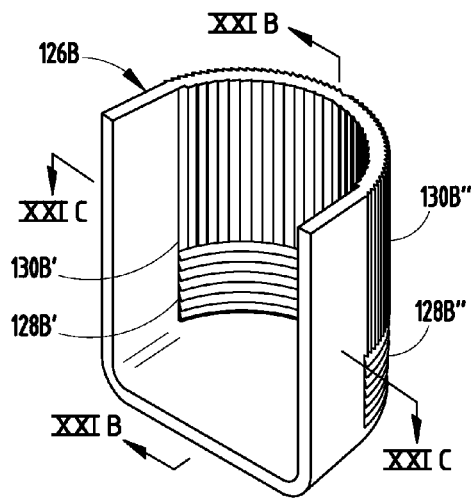
FIG. 21A is a back-side perspective view of an outer lens of an optic pack of the notification appliance of FIG. 18.
Figure 21B:
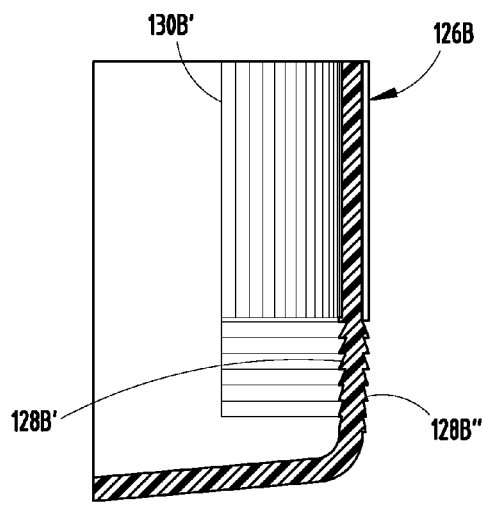
FIG. 21B is a partial cross-sectional view of the outer lens along the line XXI B of FIG. 21A.
Figure 21C:
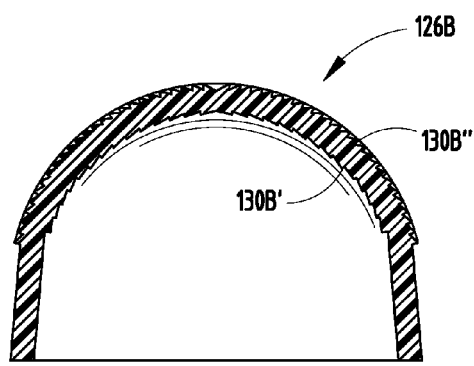
FIG. 21C is a partial cross-sectional view of the outer lens along the line XXI C of FIG. 21A.
Figure 21D:
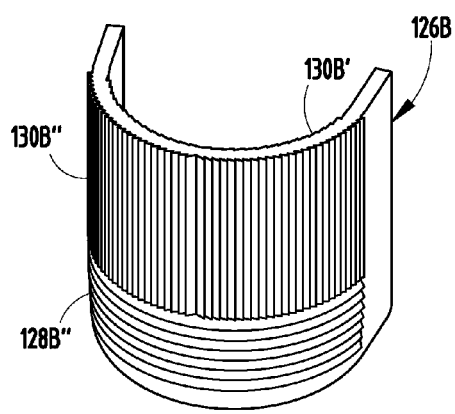
FIG. 21D is a front-side perspective view of the outer lens of FIG. 21A.

With respect to FIGS. 12A and 12B, an exemplary variable hyper-pulse is illustrated, according to one embodiment. As to FIG. 12A, the controller 106 can control the light source 104 to variably hyper-pulse during a one hundred milliseconds (100 ms) time period per one second (1 sec). In regards to FIG. 12B, the one hundred milliseconds (100 ms) variable hyper-pulse is shown, wherein the controller 106 hyper-pulses the light source 104 at varying hyper-pulse intensities a plurality of times during the one hundred milliseconds (100 ms) pulse time period. It should be appreciated that the variable hyper-pulse intensities and the one hundred milliseconds (100 ms) time period of FIGS. 12A and 12B are for purposes of explanation and not limitation, such that any suitable intensities and pulse time periods can be utilized.

It should be appreciated that the controller 106 can pulse the light source 104 to emit light as a common multi-pulse (FIGS. 9A and 9B), a variable multi-pulse (FIGS. 10A and 10B), a common hyper-pulse (FIGS. 11A and 11B), a variable hyper-pulse (FIGS. 12A and 12B), the like, or a combination thereof.

Additionally or alternatively, the notification appliance 100 can further include a projection light source 112. The projection light source can be in communicative connection with the controller 106, wherein the projection light source 112 is configured to emit light through an at least partially transparent substrate to project an image on a surface adjacent the notification appliance 100. The image can be projected when the sensor 102 detects the at least one environmental condition. Typically, the projected image corresponds to the at least one detected environmental condition. The at least partially transparent substrate can be integrated with a face plate 116 of a housing 118 of the notification appliance 100, a bezel 120 of the housing 118, the like, or a combination thereof.

According to one embodiment, the projection light source 112 is a light pipe. Additionally or alternatively, the projection light source 112 can be configured to be pulsed or constant ON, of specific color(s) to indicate which at least one environmental condition has been detected. Thus, the controller 106 can control the projection light source 112 to be substantially synchronous with the pulse time period of the light source 104.

According to one embodiment, the image projected by the projection light source 112 can be a text, a symbol, the like, or a combination thereof. By way of explanation and not limitation, the notification appliance 100 can be used in a room equipped to comply with the American's with Disability Act (ADA). In such an embodiment, the image projected by the projection light source 112 can be text, one or more symbols, the like, or a combination thereof, to indicate which at least one environmental condition has been detected, since an audible enunciator 114 emitting an audible sound may not be heard by a person having a hearing impairment.

According to an alternate embodiment, the projection light source 112 can be a liquid crystal display (LCD), or similar display, to indicate which at least one environmental condition has been detected by the sensor 102. However, it should be appreciated that the projection light source 112 can be other suitable light sources or devices configured to project an image on a surface adjacent the notification appliance 100.

Additionally or alternatively, the notification appliance 100 can include a motion detector device. Typically, the motion detector device can be used to determine if there is motion in the ambient surroundings of the notification appliance 100, such as, but not limited to, whether a person is moving. By way of explanation and not limitation, in an embodiment that includes the light source 104, different light source, or a combination thereof, functioning as a night light, the motion detector can be utilized to determine if there is motion to either activate or deactivate the night light setting. Such a function can be combined with the ambient light sensor 108, such that if it is determined that there is low ambient light and motion has not been detected for a period of time, and it is known that the notification appliance 100 is located in a bedroom, it can be assumed that a person is asleep, such that the notification appliance 100 can function in a desired manner (e.g., operate as a night light, alter flash intensity and pulse duration differently than if a person were awake, the like, or a combination thereof). The motion detector device can be used to detect motion in combination with an environmental condition being detected, such that the notification appliance 100 can activate one or more light sources 104 to a emit additional light (e.g., flood lighting to illuminate a hallway) during the emergency situation.

For purposes of explanation and not limitation, the at least one environmental condition can be an input from a panel, a signal, a coded signal, fire, smoke, carbon dioxide, carbon monoxide, tornado, terrorist attack, intruder, heat, a door bell that has been activated to ring, a telephone that has been activated to ring, the like, or a combination thereof. Additionally or alternatively, the notification appliance can include an audible enunciation device configured to emit an audible sound when the sensor detects the at least one environmental condition. According to one embodiment, the notification appliance 100 can be configured to be in a notification appliance system, wherein the notification appliance 100 is in communicative connection with a similar notification appliance, a legacy notification appliance, or a combination thereof.

Exemplary notification appliances or devices having one or more sensors for detecting environmental conditions and notification systems are disclosed in commonly assigned U.S. Pat. No. 6,876,305 entitled "COMPACT PARTICLE SENSOR," U.S. Pat. No. 6,225,910 entitled "SMOKE DETECTOR," U.S. Pat. No. 6,326,897 entitled "SMOKE DETECTOR," U.S. Pat. No. 6,653,942, entitled "SMOKE DETECTOR," U.S. Patent Application Publication No. 2008/0018485 entitled "OPTICAL PARTICLE DETECTORS," U.S. Pat. No. 6,556,132 entitled "STROBE CIRCUIT," U.S. Pat. No. 7,167,099 entitled "COMPACT PARTICLE SENSOR," U.S. patent application Ser. No. 12/188,740 entitled "NOTIFICATION SYSTEM AND METHOD THEREOF," and U.S. patent application Ser. No. 12/429,646 entitled "DETECTION DEVICE SYSTEM AND DETECTION THEREOF," all of which the entire disclosures are hereby incorporated herein by reference.

According to one embodiment, the light source 104 can be a white LED light source, a non-white LED light source, or a combination thereof. In an embodiment that includes multiple light sources 104, a first light source can be configured to emit light during a first pulse time period, and second light source can be configured to emit light during a second pulse time period. In such an embodiment, the first light source can be a white LED light source, and the second light source can be a non-white LED light source. Alternatively, at least a portion of a plurality of light sources 104 can emit light having substantially the same wavelength, different wavelengths, or a combination thereof. Additionally or alternatively, when multiple light sources 104 are being utilized, the first light source can be independently controlled from the second light source to emit light.

According to an embodiment that includes at least two light sources 104, the controller 106 can be configured to alter an illumination pattern of the emitted light from at least a portion of the at least two light sources to increase a brightness of emitted light projected at an area proximate the notification appliance 100. The notification appliance 100 can include an optic pack generally indicated at reference identifier 122 (FIGS. 15-22). Typically, the optic pack 122 is in optical communication with the light source 104, wherein the optic pack 122 is configured to project the emitted light in an illumination pattern.

In reference to FIGS. 2A-5B and 14, an illumination pattern can include the emitted light projected in an approximately 45° horizontal direction with respect to a left side of the light source 104, and approximately 45° horizontal direction with respect to a right side of the light source 104, and in an upwards and downwards vertical direction with respect to a center of the light source 104, according to one embodiment. Typically, an illumination pattern can substantially comply with UNDERWRITERS LABORATORY™ (UL) 1971.

According to one embodiment, as exemplary illustrated in FIGS. 15-17D, the optic pack 122 is a two lens optic pack including an inner lens generally indicated at reference identifier 132A in optical communication with the light source 104. The inner lens 132A can include a collimator 124A in optical communication with the light source 104. The inner lens 132A can include a first surface 134A, a second surface 136A, and a third surface 137A. The first, second, and third surfaces 134A, 136A, 137A can at least partially include Fresnel optics, such that the first surface 134A can be a substantially horizontal Fresnel surface to spread emitted light substantially vertically, the second surface 136A can be a substantially vertical Fresnel surface to spread emitted light substantially horizontally, and the third surface 137A can be an angled Fresnel surface (e.g., intermediate to absolute vertical and absolute horizontal) to spread the light at an angle. According to one embodiment, the third surface 137A spreads emitted light at approximately forty-five degrees (45°).

The two lens optic pack 122 can further include an outer lens generally identified at reference identifier 126A in optical communication with the inner lens 132A. The outer lens 126A can include a first inner surface 128A', a first outer surface 128A", a second inner surface 130A', and a second outer surface 130A". Typically, the first inner and outer surfaces 128A', 128A" and the second inner and outer surfaces 130A', 130A" can at least partially include Fresnel optics. In such an embodiment, the first inner and outer surfaces 128A', 128A" can be a substantially horizontal Fresnel surfaces that spread emitted light substantially vertically, and the second inner and outer surfaces 130A', 130A" can be a substantially vertical Fresnel surfaces that spread emitted light substantially horizontally.

According to an alternate embodiment, as exemplary illustrated in FIGS. 18-21D, the optic pack 122 can be a three lens optic pack 122 including a collimator 124B in optical communication with the light source 104, an inner lens 132B in optical communication with the collimator 124B, and an outer lens 126B in optical communication with the inner lens 132B. Typically, the inner lens 132B includes a first inner surface 134B', a first outer surface 134B", a second inner surface 136B', and a second outer surface 136B". The first inner and outer surfaces 134B', 134B", and the second inner and outer surfaces 136B', 136B", can at least partially include Fresnel optics. In such an embodiment, the first inner and outer surfaces 134B', 134B" can be a substantially horizontal Fresnel surfaces that spread emitted light substantially vertically, and the second inner and outer surfaces 136B', 136B" can be a substantially vertical Fresnel surfaces that spread emitted light substantially horizontally.

Figure 22:
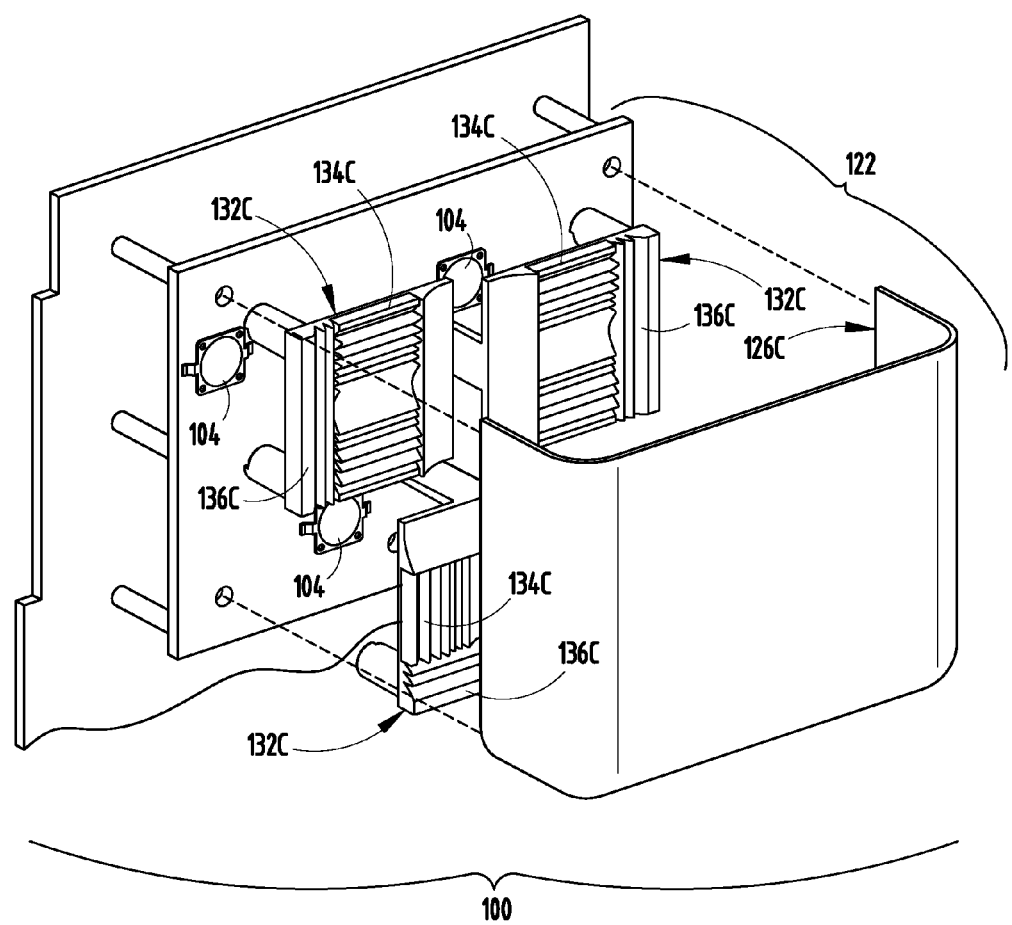
FIG. 22 is a front-side perspective exploded view of a notification appliance having an optic pack, in accordance with one embodiment of the present invention.

Additionally or alternatively, the outer lens 126B can include a first inner surface 128B', a first outer surface 128", a second inner surface 130B', and a second outer surface 130B". Typically, the first inner and outer surfaces 128B', 128B" and the second inner and outer surfaces 130B', 130B" can at least partially be Fresnel optics. In such an embodiment, the first inner and outer surfaces 128B', 128B" can be a substantially horizontal Fresnel surfaces that spread emitted light substantially vertically, and the second inner and outer surfaces 130B', 130B" can be a substantially vertical Fresnel surfaces that spread emitted light substantially horizontally According to one embodiment, the optic pack 122 can include a plurality of collimators 124, a plurality of inner lenses 132, a plurality of outer lenses 126, or a combination thereof. An exemplary illustration of such an embodiment is shown in FIG. 22. Typically, the optic pack 122 includes a collimator 124, an inner lens 132, or a combination thereof, for each light source 104.

Figure 23:
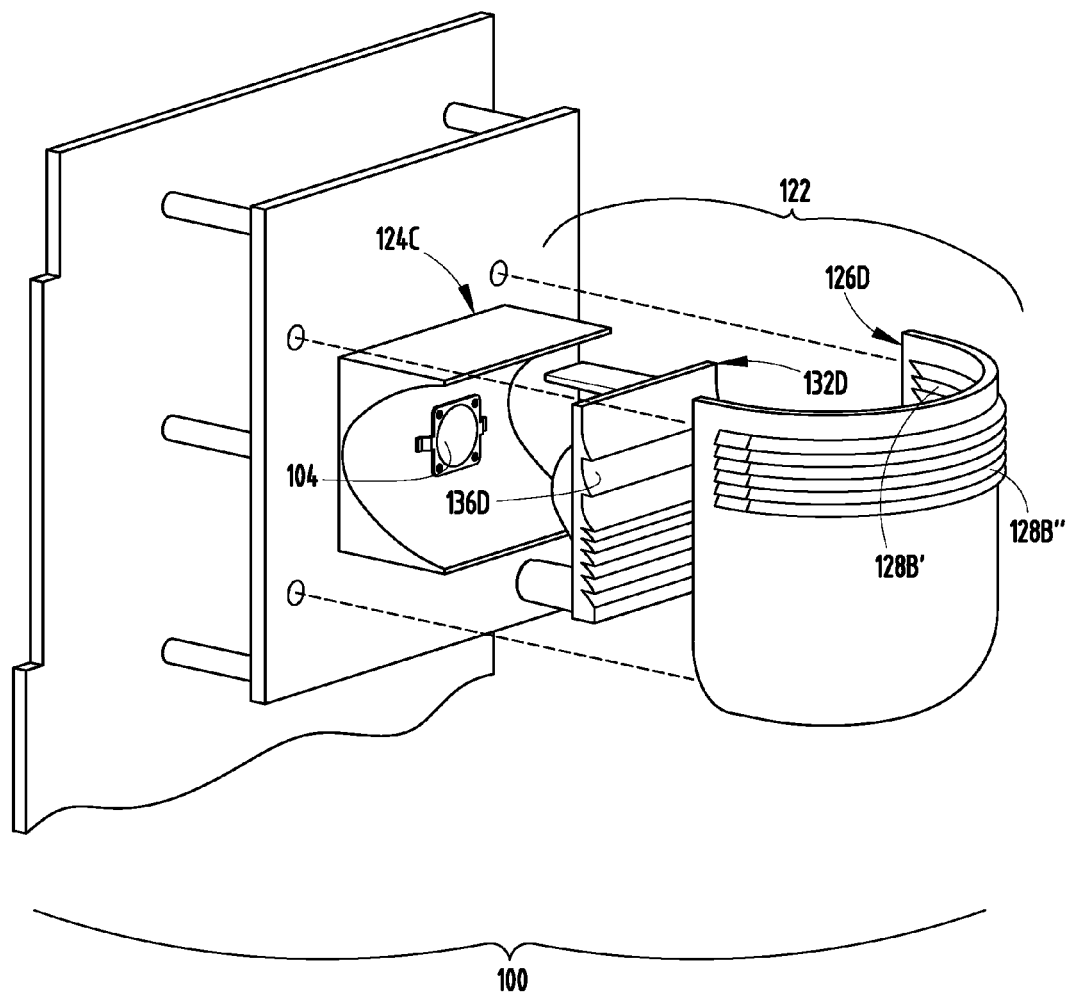
FIG. 23 is a front-side perspective exploded view of a notification appliance having an optic pack, in accordance with one embodiment of the present invention.

According to an alternate embodiment, as exemplary illustrated in FIG. 23, the optic pack 122 can be a reflector optic pack including a reflector in optical communication with the light source 104, an inner lens 132C in optical communication with the optical reflector 138, and an outer lens 126C in optical communication with the inner lens 132C. The inner lens 132C can include a first surface 134C and a second surface 136C. The first surface 134C can be a substantially horizontal Fresnel surface, and the second surface 136C can be a substantially vertical Fresnel surface. The outer lens 126C can include a first surface 128C and a second surface 136C. The first surface 128C can be a substantially horizontal Fresnel surface that spreads the light substantially vertically, and the second surface 136C can be a substantially vertical Fresnel surface that spreads the light substantially horizontally.

Figure 24:
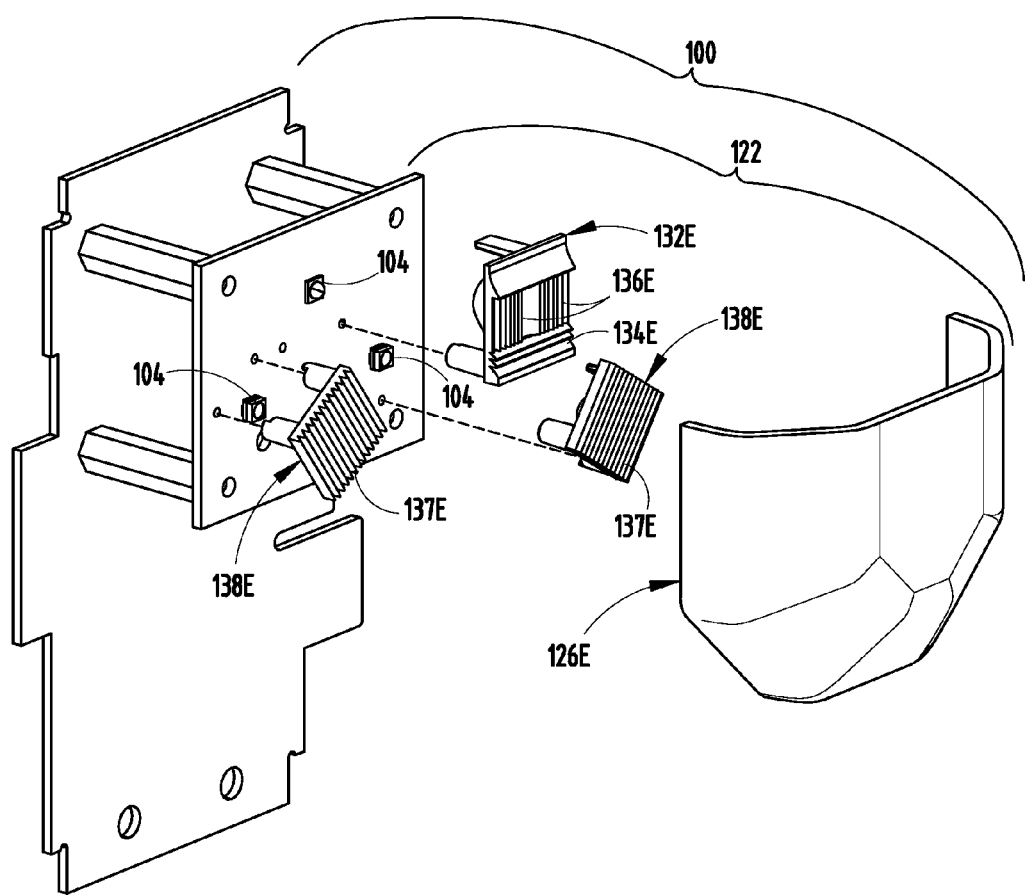
FIG. 24 is a front-side perspective exploded view of a notification appliance having an optic pack, in accordance with one embodiment of the present invention.

According to yet another alternate embodiment, as exemplary illustrated in FIG. 24, the optic pack 122 can have an inner lens 132E and an outer lens 126E. The inner lens 132E can have a first surface 134E and a second surface 136E. Typically, the first and second surfaces 134E, 136E can at least partially include Fresnel optics, such that the first surface 134E can be a substantially horizontal Fresnel surface to spread emitted light substantially vertically, and the second surface 136E can be a substantially vertical Fresnel surface to spread emitted light substantially horizontally. The optic pack 122 can further include one or more supplemental inner lenses generally indicated at reference identifier 138E. The supplemental inner lenses 138E can include a third surface 137E, which is an angled Fresnel surface (e.g., intermediate to absolute vertical and absolute horizontal) to spread the light at an angle. According to one embodiment, the third surface 137E can spread emitted light at approximately forty-five degrees (45°). In such an embodiment, the notification appliance 100 can include a light source 104 for each inner lens 132E and each supplemental inner lens 138E. However, it should be appreciated that the number of light sources 104 included in the notification appliance 100 can be less than, equal to, or greater than the number of inner lenses 132E and supplemental inner lenses 138E.

Figure 25:
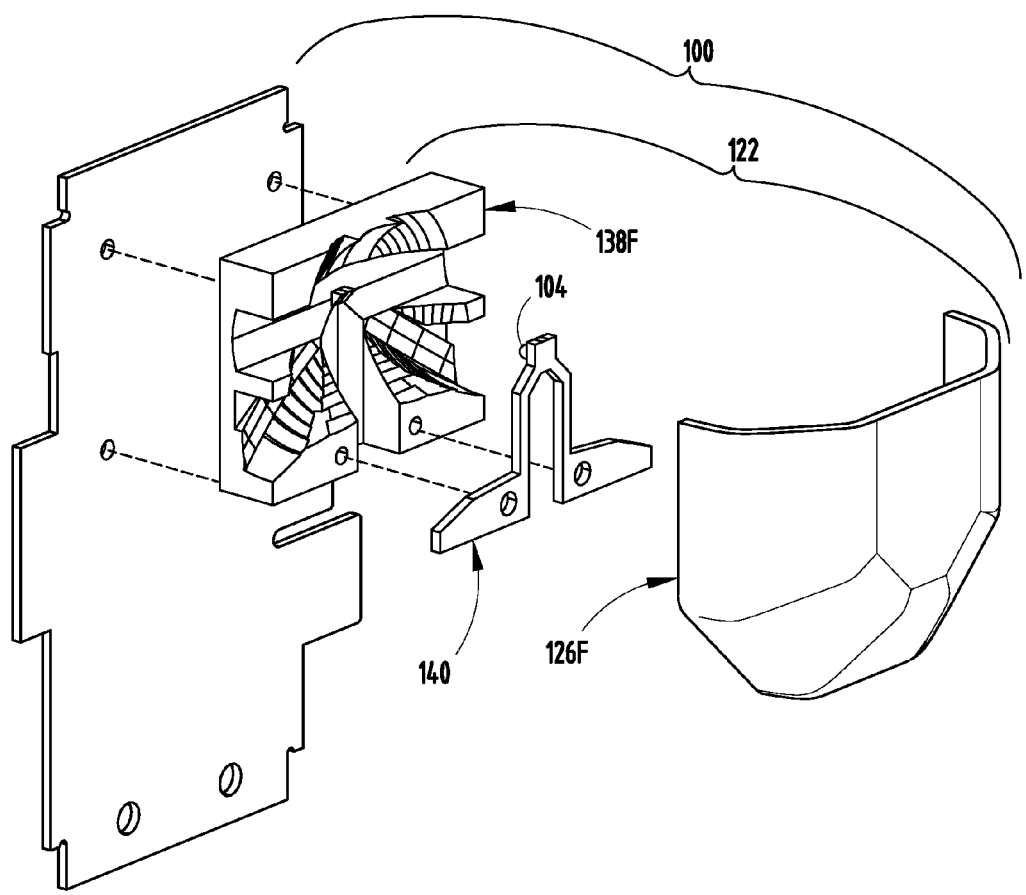
FIG. 25 is a front-side perspective exploded view of a notification appliance having an optic pack, in accordance with one embodiment of the present invention.

An alternative embodiment is exemplary illustrated in FIG. 25, wherein the optic pack 122 includes an outer lens 126F and an inverted reflector 138F. The optic pack 122 can further include a circuit board 140, wherein at least one light source 104 is mounted on the circuit board 140, such that light is emitted from the at least one light source 104 towards the inverted reflector 138F. Typically, the inverted reflector 138F is configured to reflect light in a direction that results in an illumination pattern substantially complying with UL 1971. The inverted reflector 138F can include one or more surface curvatures, reflective characteristics, the like, or a combination thereof, to control an illumination pattern that is a function of the inverted reflector 138F reflecting at least a portion of the light emitted by the one or more light sources 104.

Figure 26:
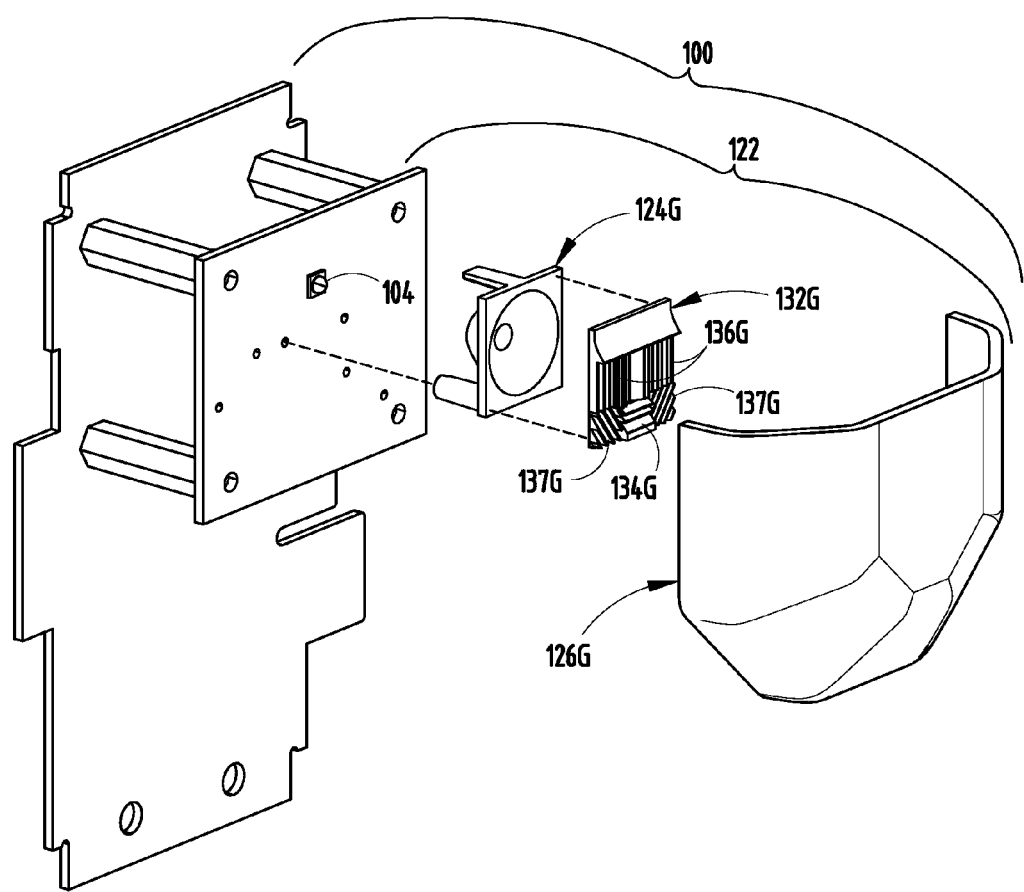
FIG. 26 is a front-side perspective exploded view of a notification appliance having an optic pack, in accordance with one embodiment of the present invention.

According to an alternate embodiment, as illustrated in FIG. 26, the optic pack 122 can include a collimator 124G, an outer lens 126G, and an inner lens 132G. In such an embodiment, the inner lens 132G includes a first surface 134G, a second surface 136G, and third surface 137G. The first, second, and third surfaces 134G, 136G, 137G can at least partially include Fresnel optics, such that the first surface 134A can be a substantially horizontal Fresnel surface to spread emitted light substantially vertically, the second surface 136A can be a substantially vertical Fresnel surface to spread emitted light substantially horizontally, and the third surface 137G can be an angled Fresnel surface (e.g., intermediate to absolute vertical and absolute horizontal) to spread the light at an angle. According to one embodiment, the third surface 137G spreads emitted light at approximately forty-five degrees (45°). Thus, the inner lens 132G can be a combination of the inner lens 132E and two supplemental inner lenses 138E (FIG. 24).

Figure 27:
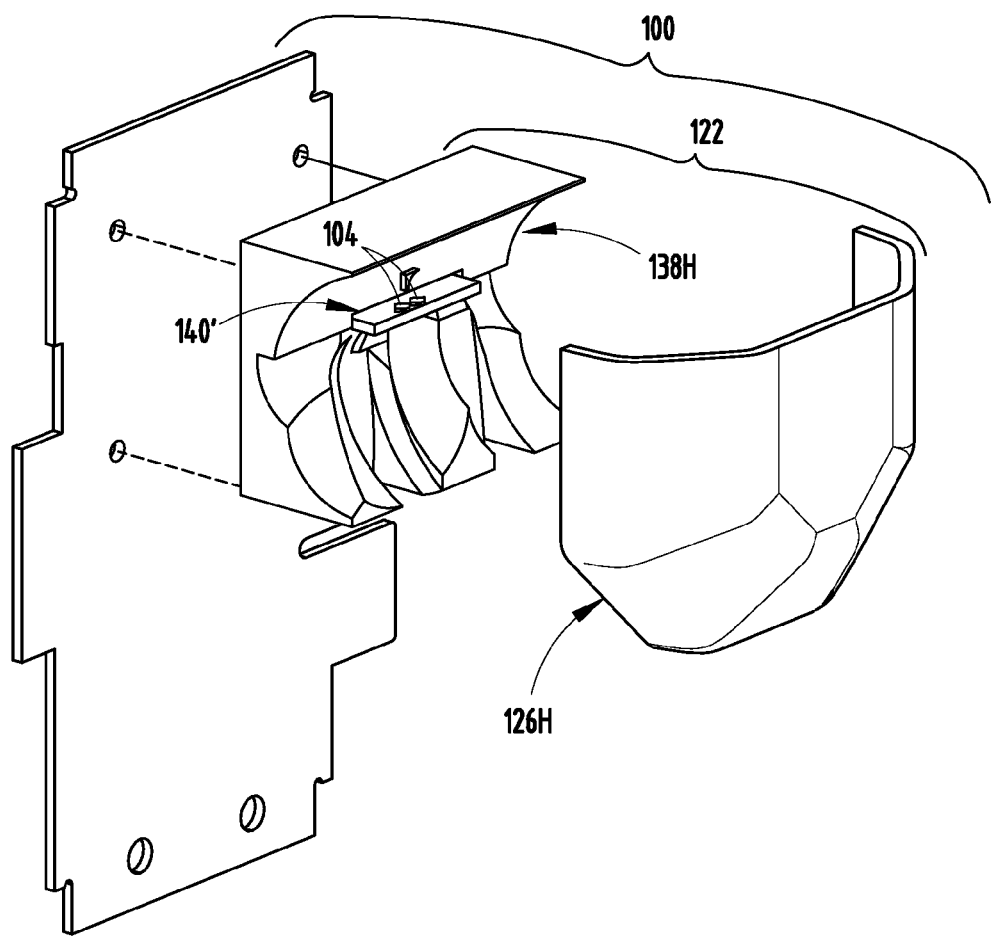
FIG. 27 is a front-side perspective exploded view of a notification appliance having an optic pack, in accordance with one embodiment of the present invention.

Yet another alternate embodiment is exemplary illustrated in FIG. 27, wherein the optic pack 122 includes an outer lens 126H and a reflector 138H. In such an embodiment, a circuit board 140' extends above the reflector 138H and includes one or more light sources 104. Typically, the reflector 138H alone, or in combination with the outer lens 126H, is configured to emit light in an illumination pattern that substantially complies with UL 1971. The inverted reflector 138H can include one or more surface curvatures, reflective characteristics, the like, or a combination thereof, to control an illumination pattern that is a function of the inverted reflector 138H reflecting at least a portion of the light emitted by the one or more light sources 104.

Figure 28:
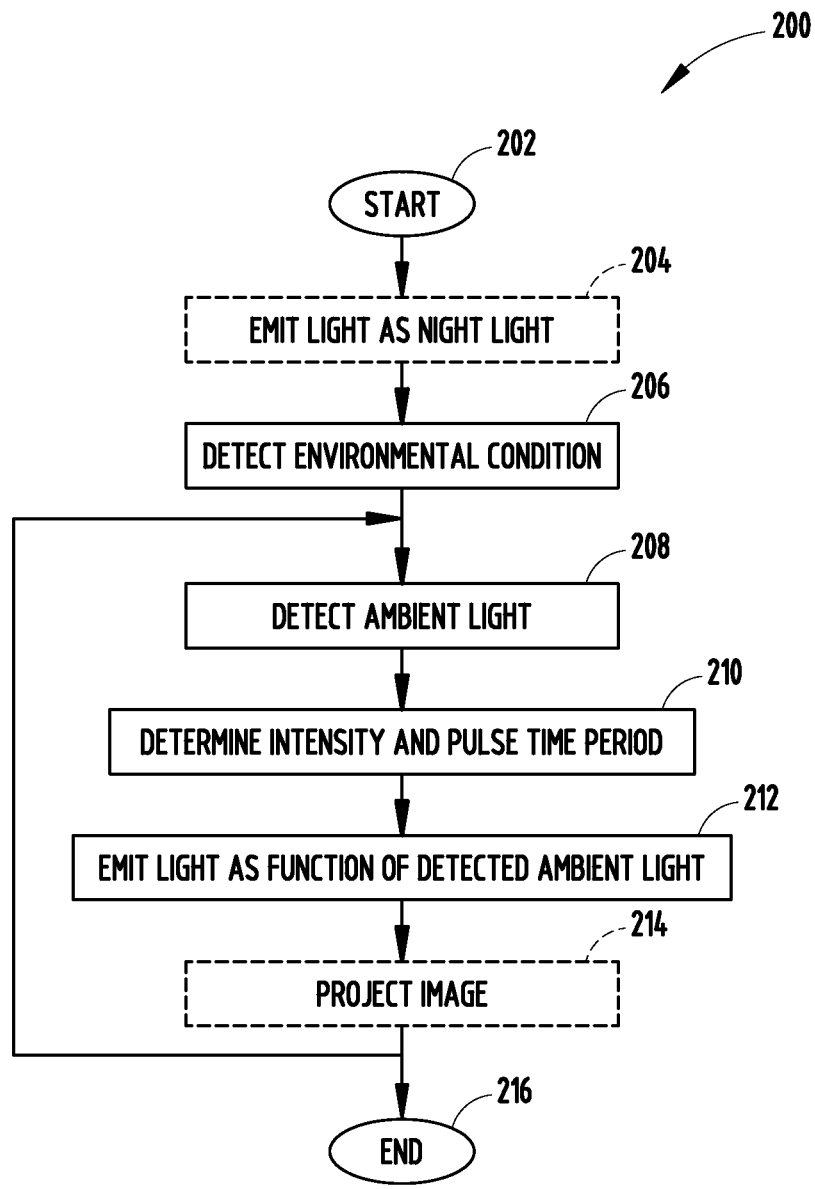
FIG. 28 is a flowchart illustrating a method for illuminating at least one light source of a notification appliance that can be configured to emit a notification output based upon at least one detected environmental condition, in accordance with one embodiment of the present invention.

With respect to FIGS. 1 and 28, a method for illuminating at least one light source of a notification appliance 100 that can be configured to emit a notification output based upon at least one detected environmental condition is generally shown in FIG. 28 at reference identifier 200. The method 200 starts at step 202, and proceeds to step 204, wherein light can be emitted by the light source 104, a different light source, or a combination thereof, as a night light, according to one embodiment. At step 206, the notification appliance 100 can detect at least one environmental condition. The detection can be by the sensor 102 being a detector or receiving a signal from another device of a system that includes the notification appliance 100 (e.g., the notification appliance 100 is an enunciator), according to one embodiment. At step 208, the notification appliance 100 can detect ambient light proximate the notification appliance 100.

The method 200 can then proceed to step 210, wherein an intensity and pulse time period of the light source 104 can be determined. Typically, the intensity and pulse time period are determined based upon the detected ambient light proximate the notification appliance 100, such that an effective intensity is substantially maintained while enhancing a perceived brightness of the emitted light. At step 212, light is emitted as a function of the detected ambient light. According to one embodiment, the method 200 can include step 214, wherein an image is projected that corresponds to the detected environmental condition. The method 200 can then proceed from either step 212 or step 214 and end at step 216. Additionally or alternatively, the method 200 can continuously cycle from step 212 or step 214 to return to step 208, such that the ambient light is continued to be detected, and the intensity and pulse time period can be altered at step 210. In such an embodiment, the method 200 can cycle until power to the notification appliance 100 is turned OFF, or the notification appliance 100 is reset.

Figure 29:
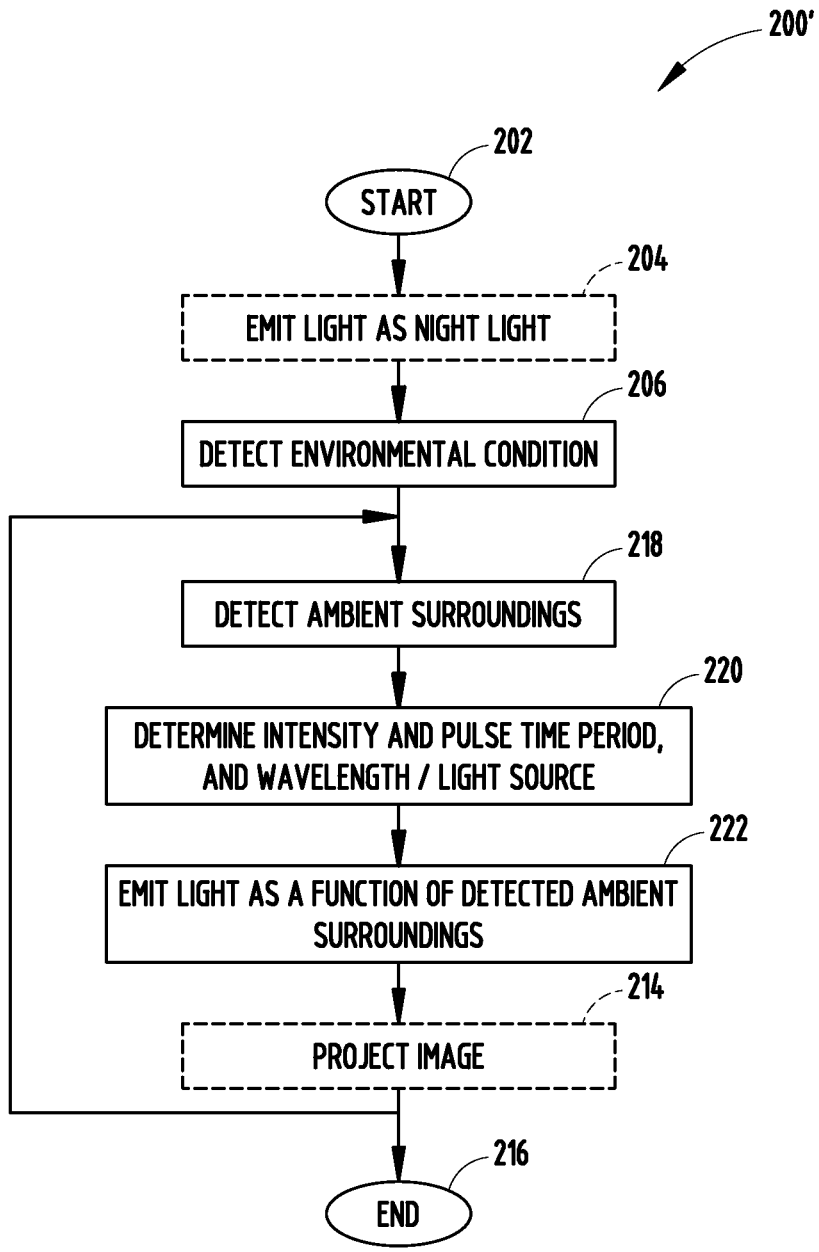
FIG. 29 is a flowchart illustrating a method for illuminating at least one light source of a notification appliance that can be configured to emit a notification output based upon at least one detected environmental condition, in accordance with one embodiment of the present invention.

In regards to FIGS. 1 and 29, a method for illuminating at least one light source 104 of a notification appliance 100 that can be configured to emit a notification output based upon at least one detected environmental condition is generally shown in FIG. 29, at reference identifier 200'. The method 200' starts at step 202, and proceeds to step 204, wherein light can be emitted by the light source 104, a different light source, or a combination thereof, as a night light, according to one embodiment. At step 206, the notification appliance 100 can detect at least one environmental condition. The detection can be by the sensor 102 being a detector for receiving a signal from another device of a system that includes a notification appliance 100 (e.g., the notification appliance 100 is an enunciator), according to one embodiment.

At step 218, the notification appliance 100 can detect ambient surroundings. In such an embodiment, the notification appliance 100 includes the camera/sensor 110, which detects ambient surroundings around the notification appliance 100. The method 200 can then proceed to step 220, wherein an intensity, a pulse time period, and a wavelength or light source is determined. Typically the wavelength or light source is determined based upon the color of light to be emitted. As set forth in the above example of the camera/sensor 110, if the ambient surroundings are determined to be red, then the light emitted by the light source 104 can be in a wavelength of red color or a red light source can be selected for operation. Further, the intensity and pulse time period are typically determined based upon a detected ambient light proximate the notification appliance 100, such that an effective intensity is substantially maintained while enhancing a perceived brightness of the emitted light.

At step 222, the light is emitted as a function of the detected ambient surroundings. According to one embodiment, the method 200' can include step 214, wherein an image is projected that corresponds to the detected environmental condition. The method 200' can then proceed from either step 212 or from step 214 and end at step 216. Additionally or alternatively, the method 200' can continuously cycle from step 212 or from step 214 and return to step 208, such that ambient surroundings are continued to be detected, and the intensity, pulse time period, and wavelength/light source can be altered at step 220. In such an embodiment, the method 200' can cycle until power to the notification appliance 100 is turned OFF or the notification appliance 100 is reset.

One aspect of the present invention generally relates to a notification appliance and a method thereof, and more particularly, a notification appliance configured to emit a notification using an LED emitter with a pulse duration of approximately less than or equal to two hundred milliseconds (200 ms), maintaining similar effective intensity, while enhancing the perceived brightness and method thereof.

Alternatively, upon detection of a least one environmental condition, the notification appliance can have the ability to modify the flash intensity, pulse duration, pulse signature, spectral output, pattern or a combination thereof, based on an additional detected ambient or spectral condition of a localized environment and method thereof.

According to one aspect of the present invention, a notification appliance that can be configured to emit a notification output based upon at least one detected environmental condition includes a sensor configured to detect the at least one environmental condition, and at least one light source, wherein the controller is configured to emit light for a set pulse time period between approximately one millisecond (1 ms) and two hundred milliseconds (200 ms).

According to another aspect of the present invention, a notification appliance that can be configured to emit a notification output based upon at least one detected environmental condition includes a sensor configured to detect the at least one environmental condition, and at least one light source, wherein the controller is configured to emit light for a set pulse time period between approximately twenty-five milliseconds (25 ms) and one hundred seventy-five milliseconds (175 ms).

According to another aspect of the present invention, a notification appliance that can be configured to emit a notification output based upon at least one detected environmental condition includes a sensor configured to detect the at least one environmental condition, and at least one light source, wherein the controller is configured to emit light for a set pulse time period between approximately seventy-five milliseconds (75 ms) and one hundred milliseconds (100 ms).

According to another aspect of the present invention, a notification appliance that can be configured to emit a notification output based upon at least one detected environmental condition includes a sensor configured to detect the at least one environmental condition, at least one light source configured to emit light during a pulse time period, and a controller in communication with the sensor and the at least one light source, wherein the controller is configured to alter the pulse time period between approximately one millisecond (1 ms) and two hundred milliseconds (200 ms).

According to another aspect of the present invention, a notification appliance that can be configured to emit a notification output based upon at least one detected environmental condition includes a sensor configured to detect the at least one environmental condition, at least one light source configured to emit light during a pulse time period, and a controller in communication with the sensor and the at least one light source, wherein the controller is configured to alter the pulse time period between approximately twenty-five millisecond (25 ms) and one hundred and seventy-five milliseconds (175 ms).

According to another aspect of the present invention, a notification appliance that can be configured to emit a notification output based upon at least one detected environmental condition includes a sensor configured to detect the at least one environmental condition, at least one light source configured to emit light during a pulse time period, and a controller in communication with the sensor and the at least one light source, wherein the controller is configured to alter the pulse time period between approximately seventy-five millisecond (75 ms) and one hundred milliseconds (100 ms).

According to another aspect of the present invention, a notification appliance that can be configured to emit a notification output based upon at least one detected environmental condition includes a sensor configured to detect the at least one environmental condition, and at least one light source, wherein the controller is configured to emitted light for a set pulse time period, while having a specific pulse signature, such as common or variable multi-pulses, and common or variable hyper-pulses within the set pulse time period.

According to another aspect of the present invention, a notification appliance that can be configured to emit a notification output based upon at least one detected environmental condition includes a sensor configured to detect the at least one environmental condition, and at least one light source, wherein the controller is configured to set the emitted light at a specified spectral distribution profile tuned to enhance the human eye response.

According to another aspect of the present invention, a notification appliance that can be configured to emit a notification output based upon at least one detected environmental condition includes a sensor configured to detect the at least one environmental condition, and at least one light source, wherein the controller is configured to alter the emitted light at a specified spectral distribution profile tuned to enhance the human eye response.

According to another aspect of the present invention, a notification appliance that can be configured to emit a notification output based upon at least one detected environmental condition includes a sensor configured to detect the at least one environmental condition, and at least two light sources, wherein the controller is configured to have the ability to change the emitted light pattern, and add additional light in a specific area.

According to another aspect of the present invention, a notification appliance that can be configured to emit a notification using at least one white or non-white LED emitter, is used to indicate specified notification conditions.

According to another aspect of the present invention, a notification appliance that can be configured to emit a notification using a combination of at least one white and non-white LED emitter, uses the different color(s) to indicate multiple notification conditions.

According to another aspect of the present invention, a notification appliance that can be configured to emit a notification using at least one RGB, binary complimentary white, or multiple die LED emitter, uses the different colors to indicate multiple notification conditions.

According to one aspect of the present invention, a notification appliance that can be configured to emit a notification output based upon at least one detected environmental condition includes a sensor configured to detect the at least one environmental condition, at least one light source configured to emit light having an intensity during a pulse time period when the sensor detects the at least one environmental condition, and an ambient light sensor configured to detect ambient light in an area proximate the notification appliance. The notification appliance further includes a controller in communication with the sensor, the at least one light source, and the ambient light sensor, wherein the controller is configured to alter the intensity and the pulse time period of the emitted light as a function of the detected ambient light by the ambient light sensor.

According to another aspect of the present invention, a notification appliance that can be configured to emit a notification output based upon at least one detected environmental condition includes a sensor configured to detect the at least one environmental condition, at least one light source configured to emit light having an intensity during a pulse time period when the sensor detects the at least one environmental condition, and an ambient light sensor configured to detect ambient light in an area proximate the notification appliance. The notification appliance further includes a controller in communication with the sensor, the at least one light source, and the ambient light sensor, wherein the controller is configured to alter the at least one intensity of the emitted light, the pulse time period of the emitted light, and a spectral characteristic of the emitted light as a function of at least one of the detected ambient light by the ambient light sensor and the at least one detected environmental condition.

According to another aspect of the present invention, a notification appliance that can be configured to emit a notification output based upon at least one detected environmental condition includes a sensor configured to detect the at least one environmental condition, at least one light source configured to emit light having an intensity during a pulse time period when the sensor detects the at least one environmental condition, and a RGB camera configured to detect the color of the environment in an area proximate the notification appliance. The notification appliance can further include a controller in communication with the sensor, the at least one light source, and the RGB camera, wherein the controller is configured to alter the intensity and the pulse time period of the emitted light as a function of the detected ambient light by the ambient light sensor.

According to another aspect of the present invention, a notification appliance that can be configured to emit a notification output based upon at least one detected environmental condition includes a sensor configured to detect the at least one environmental condition, at least one light source configured to emit light having an intensity during a pulse time period when the sensor detects the at least one environmental condition, and a RGB camera configured to detect the color of the environment in an area proximate the notification appliance. The notification appliance can further include a controller in communication with the sensor, the at least one light source, and the RGB camera, wherein the controller is configured to alter the at least one intensity of the emitted light, the pulse time period of the emitted light, and a spectral characteristic of the emitted light as a function of at least one of the detected ambient light by the ambient light sensor and the at least one detected environmental condition.

According to another aspect of the present invention, a notification appliance that can be configured to emit a white flashing notification output based upon at least one detected environmental condition includes a sensor configured to detect the at least one environmental condition, and an additional at least one light source configured to display the notification condition using a lit bezel or LED of various color to communicate the notification condition.

According to another aspect of the present invention, a notification appliance that can be configured to emit a white flashing notification output based upon at least one detected environmental condition includes a sensor configured to detect the at least one environmental condition, and an additional at least one light source configured to display the notification condition using a lit symbol or text on the surface of the device through a lens.

According to another aspect of the present invention, a notification appliance that can be configured to emit a white flashing notification output based upon at least one detected environmental condition can include a sensor configured to detect the at least one environmental condition, and an additional at least one light source configured to display the notification condition using a display, such as liquid crystal or LED displays.

According to another aspect of the present invention, a notification appliance that can be configured to emit a white flashing notification output based upon at least one detected environmental condition includes a sensor configured to detect the at least one environmental condition, and an additional at least one light source configured to project the notification condition using a symbol or text on an adjacent wall.

According to yet another aspect of the present invention, a method for illuminating at least one light source of a notification appliance that can be configured to emit a notification output based upon at least one detected environmental condition can include the steps of detecting the at least one environmental condition, and illuminating the light source to have an intensity during a pulse time period, wherein the pulse time period is approximately less than or equal to two hundred milliseconds (200 ms), while substantially maintaining an effective intensity and enhancing a perceived brightness of the emitted light. Such an embodiment can further include the steps of monitoring ambient light conditions proximate the notification device, and illuminating the light source as a function of the monitored ambient light.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A notification appliance configured to emit a notification output based upon at least one detected environmental condition comprising:
   a sensor configured to detect the at least one environmental condition;
   at least one light emitting diode (LED) light source configured to emit light having an intensity during a pulse time period, wherein said emitted light corresponds to said notification output;
   an ambient light sensor configured to detect ambient light in an area proximate said notification appliance; and
   a controller in communicative connection with said sensor, said at least one LED light source, and said ambient light sensor, wherein upon detection of said at least one environmental condition, said controller is configured to alter said intensity and said pulse time period of said emitted light as a function of said detected ambient light, wherein said controller alters said intensity and said pulse time period of said emitted light as a percentage of one another, and said pulse time period is approximately less than or equal to two hundred milliseconds (200 ms), so as to substantially maintain an effective intensity and enhance a perceived brightness of said emitted light.

2. The notification appliance of claim 1, wherein said pulse time period ranges between and includes approximately twenty-five milliseconds (25 ms) and one hundred seventy-five milliseconds (175 ms).

3. The notification appliance of claim 1, wherein said pulse time period ranges between and includes approximately seventy-five milliseconds (75 ms) and one hundred milliseconds (100 ms).

4. The notification appliance of claim 1, wherein said at least one LED light source is configured to be a night light, such that said controller is configured to control said at least one LED light source to substantially constantly emit said emitted light as a function of said detected ambient light by said ambient light sensor being below a threshold value.

5. The notification appliance of claim 1, wherein said controller is further configured to alter at least one of:
   a flash intensity of said emitted light by said at least one LED light source;
   a pulse duration of said emitted light by said at least one LED light source;
   a pulse signature of said emitted light by said at least one LED light source;
   a spectral characteristic of said emitted light by said at least one LED light source;
   a spectral output of said emitted light by said at least one LED light source; and
   an illumination patter of said emitted light by said at least one LED light source.

6. The notification appliance of claim 5, wherein altering said pulse signature comprises altering at least one of a common multi-pulse, a variable multi-pulse, a common hyper-pulse, and a variable hyper-pulse.

7. The notification appliance of claim 1 further comprising an audible enunciation device configured to emit an audible sound when said sensor detects the at least one environmental condition.

8. The notification appliance of claim 1, wherein said at least one LED light source comprises at least one of a white LED light source, and a non-white LED light source.

9. The notification appliance of claim 1, wherein said at least one LED light source comprises a first LED light source configured to emit a first light during a first pulsed time period, and a second LED light source configured to emit a second light during a second pulsed time period.

10. The notification appliance of claim 1, wherein said at least one LED light source comprises a first LED light source and a second LED light source, which are independently controlled to emit a first light and a second light corresponding to said emitted light.

11. The notification appliance of claim 1, wherein said at least one LED light source comprises at least two LED light sources, such that said controller is configured to alter a pattern of said emitted light from at least a portion of said at least two LED light sources to increase a brightness of said emitted light projected at the area proximate the notification appliance.

12. The notification appliance of claim 1 further comprising a projection light source in communicative connection with said controller, wherein said projection light source is configured to emit said emitted light through an at least partially transparent substrate to project an image on a surface adjacent the notification appliance.

13. The notification appliance of claim 12, wherein said image corresponds to the at least one detected environmental condition.

14. The notification appliance of claim 12, wherein said projection light source is a light pipe.

15. The notification appliance of claim 12, wherein said at least partially transparent substrate is integrated with at least one of a faceplate and a bezel.

16. The notification appliance of claim 12, wherein said controller controls said projection light source to be substantially constantly on when the at least one environmental condition is detected.

17. The notification appliance of claim 12, wherein said controller controls said projection light source substantially synchronous with said pulse time period of said at least one LED light source.

18. The notification appliance of claim 12, wherein said image projected by said projection light source is at least one of a symbol and text.

19. The notification appliance of claim 12, wherein said projection light source is a liquid crystal display (LCD).

20. The notification appliance of claim 1, wherein the at least one environmental condition comprises at least one of:
   an input from a panel;
   a signal;
   a coded signal;
   fire;
   smoke;
   carbon dioxide;
   carbon monoxide;
   tornado;
   terrorist attack;
   intruder;
   heat;
   a doorbell that has been activated to ring; and
   a telephone that has been activated to ring.

21. The notification appliance of claim 1, wherein said controller is configured to control said at least one LED light source to emit said emitted light for a set pulse time period, while having a predetermined spectral signature with said set pulse time period comprising at least one of:
   a common multi-pulse;
   a variable multi-pulse;
   a common hyper-pulse; and
   a variable hyper-pulse.

22. The notification appliance of claim 1, wherein said at least one LED light source comprises at least one of a red-green-blue (RGB) LED, a binary complimentary white LED, and a multiple die LED, such that said emitted light is emitted in different colors to indicate multiple detected environmental conditions.

23. The notification appliance of claim 1 further comprising a camera device in communicative connection with said controller, wherein said camera device is configured to detect at least one ambient condition in a detection area proximate the notification appliance, and said controller is configured to alter said emitted light by said at least one LED light source as a function of said detected at least one ambient condition.

24. The notification appliance of claim 23, wherein said detected at least one ambient condition comprises at least one of:
   ambient light; and
   a color of the detection area proximate the notification appliance.

25. The notification appliance of claim 24, wherein said camera device is a red-green-blue (RGB) camera.

26. The notification appliance of claim 24, wherein said at least one LED light source is configured to be a night light, such that said controller is configured to control said at least one LED light source to substantially constantly emit said emitted light as a function of said detected ambient light by said camera device being below a threshold value.

27. The notification appliance of claim 23, wherein said controller is further configured to modify at least one of:
   a flash intensity of said at least one LED light source;
   a pulse duration of said at least one LED light source;
   a pulse signature of said at least one LED light source;
   a spectral characteristic of said at least one LED light source;
   a spectral output of said at least one LED light source; and
   a pattern of said emitted light by said at least one LED light source.

28. The notification appliance of claim 27, wherein modifying said pulse signature comprises modifying one of a common multi-pulse, a variable multi-pulse, a common hyper-pulse, and a variable hyper-pulse.

29. The notification appliance of claim 1 further comprising an optic pack in optical communication with said at least one LED light source, wherein said optic pack is configured to project said emitted light in an illumination pattern.

30. The notification appliance of claim 29, wherein said illumination pattern substantially complies with UNDERWRITERS LABORATORY™ (UL) 1971.

31. The notification appliance of claim 29, wherein said illumination pattern comprises said emitted light being projected in an approximately forty-five degree (45°) horizontal direction with respect to a left side of said at least one LED light source, an approximately forty-five degree (45°) horizontal direction with respect to a right side of said at least one LED light source, and an upwards and downwards vertical direction with respect to a center of said at least one LED light source.

32. The notification appliance of claim 29, wherein said optic pack is a two lens optic pack comprising:
   a collimator in optical communication with said at least one LED light source, said collimator comprising Fresnel optics; and
   an outer lens in optical communication with said collimator.

33. The notification appliance of claim 32, wherein said outer lens comprises a horizontal Fresnel surface, and a vertical Fresnel surface.

34. The notification appliance of claim 29, wherein said optic pack is a three lens optic pack comprising:
   a collimator in optical communication with said at least one LED light source;
   an inner lens in optical communication with said collimator; and
   an outer lens in optical communication with said inner lens.

35. The notification appliance of claim 34, wherein said inner lens comprises a horizontal Fresnel surface, and a vertical Fresnel surface.

36. The notification appliance of claim 34, wherein said outer lens comprises a horizontal Fresnel surface, and a vertical Fresnel surface.

37. The notification appliance of claim 29, wherein said optic pack is a reflector optic pack comprising:
   a reflector in optical communication with said at least one LED light source;
   an inner lens in optical communication with said reflector; and
   an outer lens in optical communication with said inner lens.

38. The notification appliance of claim 37, wherein said inner lens comprises a horizontal Fresnel surface, and a vertical Fresnel surface.

39. The notification appliance of claim 37, wherein said outer lens comprises a horizontal Fresnel surface, and a vertical Fresnel surface.

40. The notification appliance of claim 1 further configured to be in a notification appliance system, wherein the notification appliance is in communicative connection with at least one of a similar notification appliance and a legacy notification appliance.

41. A notification appliance configured to emit a notification output based upon at least one detected environmental condition comprising:
- a sensor configured to detect the at least one environmental condition;
- at least one light source configured to emit light having at least one characteristic, and an intensity during a pulse time period, wherein said emitted light corresponds to said notification output;
- an ambient light sensor configured to detect ambient light in an area proximate the notification appliance;
- a controller in communicative connection with said sensor, said at least one light source, and said ambient light sensor, wherein upon detection of said at least one environmental condition, said controller is configured to alter said at least one characteristic, said intensity, and said pulse time period of said emitted light as a function of said detected ambient light, wherein said controller alters said intensity and said pulse time period of said emitted light as a percentage of one another so as to substantially maintain an effective intensity and enhance a perceived brightness of said emitted light.

42. The notification appliance of claim 41, wherein said at least one light source is at least one light emitting diode (LED) light source.

43. The notification appliance of claim 42, wherein said controller is configured to pulse said at least one LED light source during a time period that ranges between and includes approximately one millisecond (1 ms) and two hundred milliseconds (200 ms).

44. The notification appliance of claim 42, wherein said controller is configured to pulse said at least one LED light source during a time period that ranges between and includes approximately twenty-five milliseconds (25 ms) and one hundred seventy-five (175 ms).

45. The notification appliance of claim 42, wherein said controller is configured to pulse said at least one LED light source during a time period that ranges between and includes approximately seventy-five milliseconds (75 ms) and one hundred milliseconds (100 ms).

46. The notification appliance of claim 42, wherein said controller is further configured to modify at least one of:
- a flash intensity of said at least one LED light source;
- a pulse duration of said at least one LED light source;
- a pulse signature of said at least one LED light source;
- a spectral output of said at least one LED light source; and
- a pattern of said emitted light by said at least one LED light source.

47. The notification appliance of claim 46, wherein modifying said pulse signature comprises modifying one of a common multi-pulse, a variable multi-pulse, a common hyper-pulse, and a variable hyper-pulse.

48. The notification appliance of claim 41, wherein said at least one light source is configured to be a night light, such that said controller is configured to control said at least one light source to substantially constantly emit said emitted light as a function of said detected ambient light by said ambient light sensor being below a threshold value.

49. The notification appliance of claim 41, wherein said at least one light source comprises a first light source configured to emit a first light during a first pulsed time period and a second light source configured to emit a second light during a second pulsed time period.

50. The notification appliance of claim 49, wherein at least said first light source is a white light source, and at least said second light source is a non-white light source.

51. The notification appliance of claim 41, wherein said at least one light source comprises a first light source and a second light source, which are independently controlled to emit a first light corresponding to the first light source and a second light corresponding to the second light source.

52. The notification appliance of claim 41, wherein said at least one light source comprises at least two light sources, such that said controller is configured to alter a pattern of said emitted light from at least a portion of said at least two light sources to increase a brightness of said emitted light projected at the area proximate the notification appliance.

53. The notification appliance of claim 41, wherein said controller is configured to control said at least one light source to emit said emitted light for a set pulse time period, while having a predetermined spectral signature with said set pulse time period comprising at least one of:
- a common multi-pulse;
- a variable multi-pulse;
- a common hyper-pulse; and
- a variable hyper-pulse.

54. The notification appliance of claim 41, wherein said controller is configured to control said at least one light source to emit said emitted light at a spectral distribution profile to enhance a human eye response.

55. The notification appliance of claim 41, wherein said at least one light source comprises at least one of a red-green-blue (RGB) LED, a binary complimentary white LED, and a multiple die LED, such that said emitted light is emitted in different colors to indicate multiple detected environmental conditions.

56. The notification appliance of claim 41, wherein said ambient light sensor is a red-green-blue (RGB) ambient light sensor (ALS).

* * * * *

UNITED STATES PATENT AND TRADEMARK OFFICE
CERTIFICATE OF CORRECTION

| | |
|---|---|
| PATENT NO. | : 8,836,532 B2 |
| APPLICATION NO. | : 12/640642 |
| DATED | : September 16, 2014 |
| INVENTOR(S) | : Fish, Jr. et al. |

Page 1 of 1

It is certified that error appears in the above-identified patent and that said Letters Patent is hereby corrected as shown below:

In the Claims

Col. 20, claim 5, line 27;

"patter" should be --pattern--.

Signed and Sealed this
Twenty-third Day of June, 2015

Michelle K. Lee
*Director of the United States Patent and Trademark Office*